US012633230B2

(12) United States Patent　　(10) Patent No.:　US 12,633,230 B2
Hoffmann et al.　　(45) Date of Patent:　May 19, 2026

(54) ELECTRONIC DEVICE, METHOD AND COMPUTER PROGRAM

(71) Applicant: Sony Group Corporation, Tokyo (JP)

(72) Inventors: Falk-Martin Hoffmann, Stuttgart (DE); Giorgio Fabbro, Stuttgart (DE); Marc Ferras Font, Stuttgart (DE); Thomas Kemp, Stuttgart (DE); Stefan Uhlich, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 649 days.

(21) Appl. No.: 17/926,136

(22) PCT Filed: Jun. 4, 2021

(86) PCT No.: PCT/EP2021/065009
§ 371 (c)(1),
(2) Date: Nov. 18, 2022

(87) PCT Pub. No.: WO2021/245234
PCT Pub. Date: Dec. 9, 2021

(65) Prior Publication Data
US 2023/0186782 A1　　Jun. 15, 2023

(30) Foreign Application Priority Data

Jun. 5, 2020　(EP) ..................................... 20178622

(51) Int. Cl.
G09B 15/00　　(2006.01)
G09B 5/02　　(2006.01)
(Continued)

(52) U.S. Cl.
CPC ............... G09B 15/00 (2013.01); G09B 5/02 (2013.01); G09B 5/04 (2013.01); G10H 1/0008 (2013.01);
(Continued)

(58) Field of Classification Search
CPC . G09B 15/00; G09B 5/02; G09B 5/04; G09B 19/00; G10H 1/0008; G10H 1/361;
(Continued)

(56) References Cited

U.S. PATENT DOCUMENTS 5,525,062 A　6/1996　Ogawa et al.
8,138,409 B2　3/2012　Brennan
(Continued)

FOREIGN PATENT DOCUMENTS

CN　103971674 A　8/2014
CN　108257613 A　7/2018
(Continued)

OTHER PUBLICATIONS

Cheng et al., "Time-frequency Analysis of Musical Rhythm", Notices of the American Mathematical Society, vol. 56, No. 3, Mar. 2009, pp. 356-372.
(Continued)

*Primary Examiner* — Jeffrey Donels
(74) *Attorney, Agent, or Firm* — XSENSUS LLP

(57) ABSTRACT
An electronic device having a circuitry configured to perform audio source separation on an audio input signal to obtain a vocals signal and an accompaniment signal and to perform a confidence analysis on a user's voice signal based on the vocals signal to provide guidance to the user.

20 Claims, 14 Drawing Sheets

(51) Int. Cl.

| | |
|---|---|
| *G09B 5/04* | (2006.01) |
| *G10H 1/00* | (2006.01) |
| *G10H 1/36* | (2006.01) |
| *G10H 1/46* | (2006.01) |
| *G10L 21/0208* | (2013.01) |
| *G10L 21/028* | (2013.01) |
| *G10L 25/78* | (2013.01) |

(52) U.S. Cl.
CPC .............. *G10H 1/361* (2013.01); *G10H 1/46* (2013.01); *G10L 21/0208* (2013.01); *G10L 21/028* (2013.01); *G10L 25/78* (2013.01); *G10H 2210/005* (2013.01); *G10H 2210/066* (2013.01); *G10H 2210/071* (2013.01); *G10H 2210/091* (2013.01); *G10H 2220/011* (2013.01); *G10L 2021/02082* (2013.01)

(58) Field of Classification Search
CPC .............. G10H 1/46; G10H 2210/005; G10H 2210/066; G10H 2210/071; G10H 2210/091; G10H 2220/011; G10H 1/0016; G10H 2210/056; G10H 2220/005; G10L 21/0208; G10L 21/028; G10L 25/78; G10L 2021/02082; G10L 21/0272; G10L 25/90
See application file for complete search history.

(56) References Cited

U.S. PATENT DOCUMENTS

| | | | |
|---|---|---|---|
| 8,148,621 B2* | 4/2012 | Bright .................... | G10H 1/366 84/649 |
| 2004/0177744 A1 | 9/2004 | Strasser et al. | |
| 2006/0112812 A1 | 6/2006 | Venkataraman et al. | |
| 2009/0038467 A1 | 2/2009 | Brennan | |
| 2009/0038468 A1* | 2/2009 | Brennan .................. | G09B 5/06 84/609 |
| 2010/0107856 A1 | 5/2010 | Hetherington et al. | |
| 2010/0192752 A1* | 8/2010 | Bright .................... | G10H 1/366 84/610 |
| 2016/0049915 A1* | 2/2016 | Wang .................. | G10L 21/0364 381/107 |
| 2017/0140745 A1 | 5/2017 | Nayak et al. | |

FOREIGN PATENT DOCUMENTS

| | | |
|---|---|---|
| CN | 109272975 A | 1/2019 |
| CN | 109300485 A | 2/2019 |
| CN | 110660383 A | 1/2020 |
| CN | 111046226 A | 4/2020 |
| JP | 2005242238 A | 9/2005 |
| JP | 4481225 B2 | 6/2010 |
| WO | 2005111997 A1 | 11/2005 |

OTHER PUBLICATIONS

Li et al., "Separation of Singing Voice From Music Accompaniment For Monaural Recordings", IEEE Transactions on Audio, Speech, and Language Processing, vol. 15, No. 4, May 2007, pp. 1475-1487.
Ortiz P. et al., "A Simple but Efficient Voice Activity Detection Algorithm Through Hilbert Transform and Dynamic Threshold for Speech Pathologies", Journal of Physics: Conference Series 705 (2016) 012037, 10 pages.
Cheveigne et al., "YIN, A Fundamental Frequency Estimator for Speech and Music", J. Acoust. Soc. Am., vol. 111, No. 4, Apr. 2002, pp. 1917-1930.
Liu et al., "Fundamental Frequency Estimation Based on the Joint Time-Frequency Analysis of Harmonic Spectral Structure", IEEE Transactions on Speech and Audio Processing, vol. 9, No. 6, Sep. 2001, pp. 609-621.
Uhlich et al., "Improving Music Source Separation Based on Deep Neural Networks Through Data Augmentation and Network Blending", ICASSP 2017, pp. 261-265.
Bai et al., "Voice Activity Detection Based on Deep Neural Networks and Viterbi", IOP Conference Series: Materials Science and Engineering 231 (2017) 012042, 7 pages.
Bello et al., "A Tutorial on Onset Detection in Music Signals", IEEE Transactions on Speech and Audio Processing, 2005, pp. 1-13.
Jarne, "A Method for Estimation of Fundamental Frequency for Tonal Sounds Inspired on Bird Song Studies", MethodsX, vol. 6, 2019, pp. 124-131.
Smith et al., "Time-Frequency Representation of Musical Rhythm by Continuous Wavelets", Journal of Mathematics and Music, Jan. 2007, pp. 1-24.
Lane, John E., "Pitch Detection Using a Tunable IIR Filter", Computer Music Journal, vol. 14, No. 3 (Autumn, 1990), pp. 46-59.
Tilsen et al., "Speech Rhythm Analysis with Decomposition of the Amplitude Envelope: Characterizing Rhythmic Patterns Within and Across Languages", The Journal of the Acoustical Society of America—Jul. 2013, vol. 134, No. 1, pp. 628-639.
Enzner et al., "Frequency-Domain Adaptive Kalman Filter for Acoustic Echo Control in Hands-Free Telephones", Signal Processing, vol. 86, Issue 6, Jun. 2006, pp. 1140-1156.
Ikemiya et al., "Singing Voice Separation and Vocal F0 Estimation Based on Mutual Combination of Robust Principal Component Analysis and Subharmonic Summation", IEEE/ACM Transactions On Audio, Speech, And Language Processing, vol. 24, No. 11, Nov. 2016, pp. 2084-2095.
International Search Report and Written Opinion mailed on Sep. 7, 2021, received for PCT Application PCT/EP2021/065009, filed on Jun. 4, 2021, 12 pages.

* cited by examiner

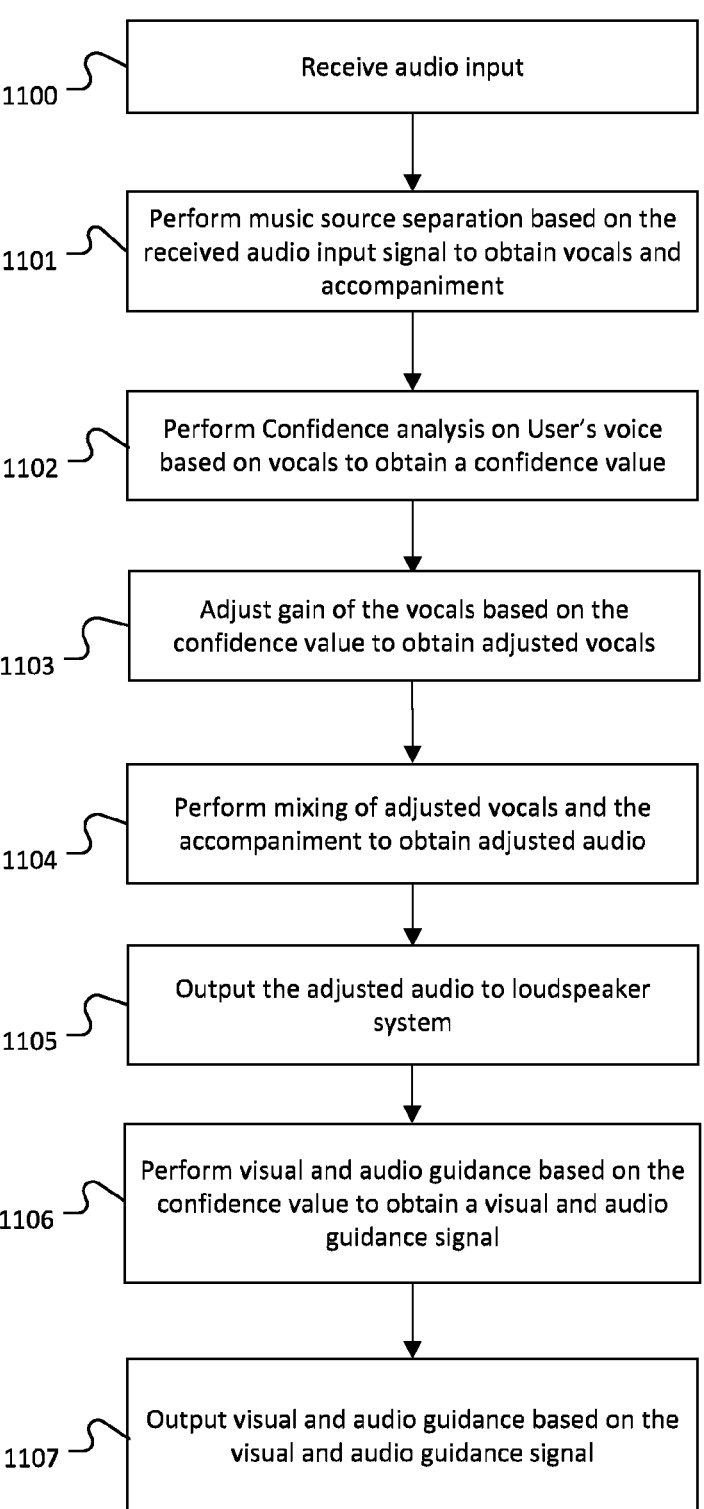

1100 — Receive audio input

1101 — Perform music source separation based on the received audio input signal to obtain vocals and accompaniment 1102 — Perform Confidence analysis on User's voice based on vocals to obtain a confidence value 1103 — Adjust gain of the vocals based on the confidence value to obtain adjusted vocals 1104 — Perform mixing of adjusted vocals and the accompaniment to obtain adjusted audio 1105 — Output the adjusted audio to loudspeaker system 1106 — Perform visual and audio guidance based on the confidence value to obtain a visual and audio guidance signal 1107 — Output visual and audio guidance based on the visual and audio guidance signal

Fig. 12

ELECTRONIC DEVICE, METHOD AND COMPUTER PROGRAM

CROSS-REFERENCE TO RELATED APPLICATIONS

The present application is based on PCT filing PCT/EP2021/065009, filed Jun. 4, 2021, which claims priority to European Application No. 20178622.5, filed Jun. 5, 2020, the entire contents of each are incorporated herein by reference.

TECHNICAL FIELD

The present disclosure generally pertains to the field of audio processing, and in particular, to de vices, methods and computer programs for audio playback.

TECHNICAL BACKGROUND

There is a lot of audio content available, for example, in the form of compact disks (CD), tapes, audio data files which can be downloaded from the interact, but also in the form of sound tracks of videos, e.g. stored on a digital video disk or the like, etc.

When a music player is playing a song of an existing music database, the listener may want to sing along. Naturally, the listener's voice will add to the original artist's voice present in the recording and potentially interfere with it. This may hinder or skew the listener's own interpretation of the song. And in some cases, a listener who is a less experienced singer or may not know the lyrics may still want to sing along and could benefit from some guidance to support and improve his own performance.

Although there generally exist techniques for audio playback, it is generally desirable to improve methods and apparatus for playback of audio content.

SUMMARY

According to a first aspect the disclosure provides an electronic device comprising circuitry configured to perform audio source separation on an audio input signal to obtain a vocals signal and an accompaniment signal and to perform a confidence analysis on a user's voice signal based on the vocals signal to provide guidance to the user.

According to a second aspect the disclosure provides a method comprising performing audio source separation on an audio input signal to obtain a vocals signal and an accompaniment signal; and per forming confidence analysis on a user's voice based on the separated source based on the vocals signal to provide guidance to the user.

According to a third aspect the disclosure provides a computer program comprising instructions, the instructions when executed on a processor causing the processor to perform audio source separation on an audio input signal to obtain a vocals signal and an accompaniment signal and to perform a confidence analysis on a user's voice signal based on the vocals signal to provide guidance to the user.

Further aspects are set forth in the dependent claims, the following description and the drawings.

BRIEF DESCRIPTION OF THE DRAWINGS

Embodiments are explained by way of example with respect to the accompanying drawings, in which FIG. 1 schematically shows a process of audio adjustment of an audio signal based on audio source separation and confidence analysis;

FIG. 12 shows a flow diagram visualizing a method for signal mixing based on a Confidence Analyzer process and based on separated sources.

DETAILED DESCRIPTION OF EMBODIMENTS

Figure 1:
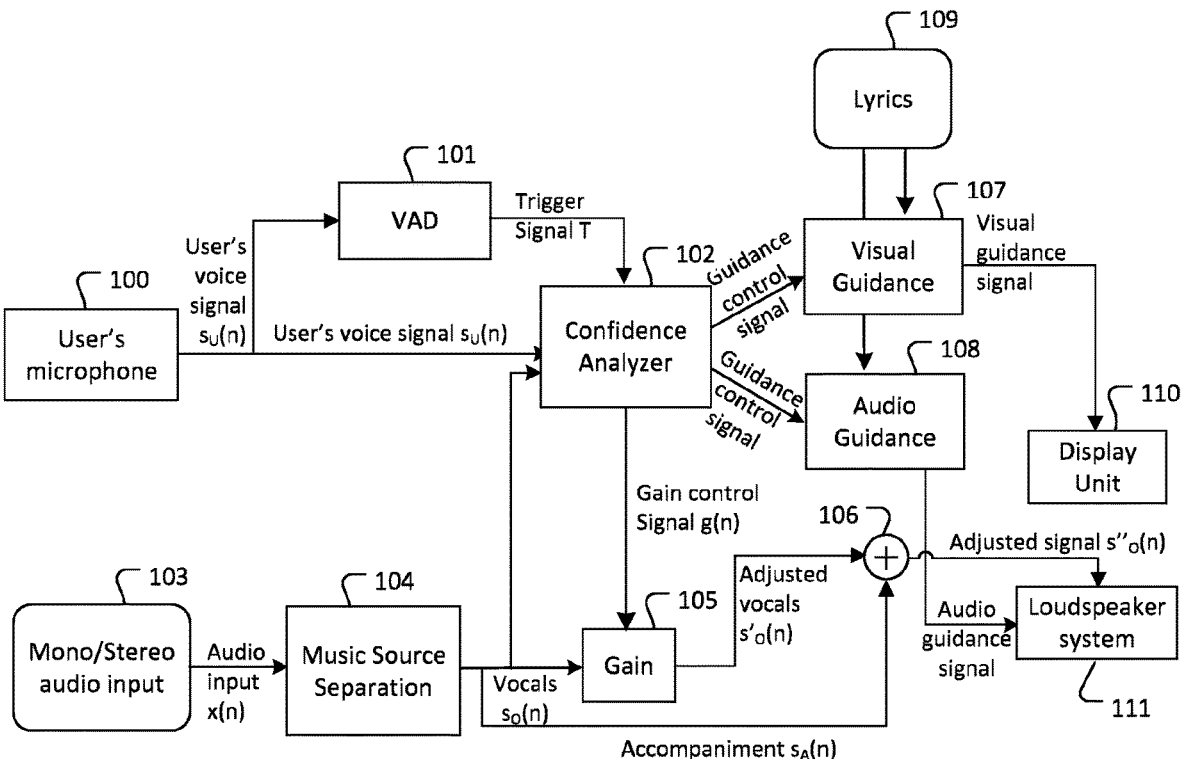

Before a detailed description of the embodiments under reference of FIG. 1 to FIG. 13, some general explanations are made.

Typically, audio content is already mixed from original audio source signals, e.g. for a mono or stereo setting, without keeping original audio source signals from the original audio sources which have been used for production of the audio content.

However, there exist situations or applications where a remixing or upmixing of the audio content would be desirable. For instance, in situations where the audio content shall be played on a device having more audio channels available than the audio content provides, e.g. mono audio content to be played on a stereo device, stereo audio content to be played on a surround sound device having six audio channels, etc. In other situations, the perceived spatial position of an audio source shall be amended or the perceived level of an audio source shall be amended.

Blind source separation (BSS), also known as bind signal separation, is the separation of a set of source signals from a set of mixed signals. One application for Blind source separation (BSS), is the separation of music into the individual instrument tracks such that an upmixing or remixing of the original con tent is possible.

In the following, the terms remixing, upmixing, and downmixing can refer to the overall process of generating output audio content based on separated audio source signals originating from mixed input audio content, while the term "mixing" can refer to the mixing of the separated audio source signals. Hence the "mixing" of the separated audio source signals can result in a "remixing", "upmixing" or "downmixing" of the mixed audio sources of the input audio content.

The embodiments disclose an electronic device comprising circuitry configured to perform audio source separation on an audio input signal to obtain a vocals signal and an accompaniment signal and to perform a confidence analysis on a user's voice signal based on the vocals signal to provide guidance to the user.

The electronic device may for example be any music or movie reproduction device such as smartphones, Headphones, a TV sets, a Blu-ray player or the like.

The circuitry of the electronic device may include a processor, may for example be CPU, a memory (RAM, ROM or the like), a memory and/or storage, interfaces, etc. Circuitry may comprise or may be connected with input means (mouse, keyboard, camera, etc.), output means (display (e.g. liquid crystal, (organic) light emitting diode, etc.)), loudspeakers, etc., a (wireless) interface, etc., as it is generally known for electronic devices (computers, smartphones, etc.). Moreover, circuitry may comprise or may be connected with sensors for sensing still images or video image data (image sensor, camera sensor, video sensor, etc.), for sensing environmental parameters (e.g. radar, humidity, light, temperature), etc.

In audio source separation, an input signal comprising a number of sources (e.g. instruments, voices, or the like) is decomposed into separations. Audio source separation may be unsupervised (called "blind source separation", BSS) or partly supervised. "Blind" means that the blind source separation does not necessarily have information about the original sources. For example, it may not necessarily know how many sources the original signal contained or which sound information of the input signal belong to which original source. The aim of blind source separation is to decompose the original signal separations without knowing the separations before. A blind source separation unit may use any of the blind source separation techniques known to the skilled person. In (blind) source separation, source signals may be searched that are minimally correlated or maximally independent in a probabilistic or information-theoretic sense or based on a non-negative matrix factorization structural constraints on the audio source signals can be found. Methods for performing (blind) source separation are known to the skilled person and are based on, for example, principal components analysis, singular value decomposition, (in)dependent component analysis, non-negative matrix factorization, artificial neural networks, etc.

Although, some embodiments use blind source separation for generating the separated audio source signals, the present disclosure is not limited to embodiments where no further information is used for the separation of the audio source signals, but in some embodiments, further information is used for generation of separated audio source signals. Such further information can be, for example, in formation about the mixing process, information about the type of audio sources included in the input audio content, information about a spatial position of audio sources included in the input audio content, etc.

The input signal can be an audio signal of any type. It can be in the form of analog signals, digital signals, it can origin from a compact disk, digital video disk, or the like, it can be a data file, such as a wave file, mp3-file or the like, and the present disclosure is not limited to a specific format of the input audio content. An input audio content may for example be a stereo audio signal having a first channel input audio signal and a second channel input audio signal, without that the present disclosure is limited to input audio contents with two audio channels. In other embodiments, the input audio content may include any number of channels, such as remixing of an 5.1 audio signal or the like.

The input signal may comprise one or more source signals. In particular, the input signal may comprise several audio sources. An audio source can be any entity, which produces sound waves, for ex ample, music instruments, voice, vocals, artificial generated sound, e.g. origin form a synthesizer, etc.

The input audio content may represent or include mixed audio sources, which means that the sound information is not separately available for all audio sources of the input audio content, but that the sound information for different audio sources, e.g. at least partially overlaps or is mixed. Moreover, the input audio content may be an unmixed object-based audio, with metadata that contains mixing instructions.

The circuitry may be configured to perform the remixing or upmixing based on at least one filtered separated source and based on other separated sources obtained by the blind source separation to obtain the remixed or upmixed signal. The remixing or upmixing may be configured to perform re mixing or upmixing of the separated sources, here "vocals" and "accompaniment" to produce a remixed or upmixed signal, which may be sent to the loudspeaker system. The remixing or upmixing may further be configured to perform lyrics replacement of one or more of the separated sources to produce a remixed or upmixed signal, which may be sent to one or more of the output channels of the loudspeaker system.

The accompaniment may be a residual signal that results from separating the vocals signal from the audio input signal. For example, the audio input signal may be a piece of music that comprises vocals, guitar, keyboard and drums and the accompaniment signal may be a signal comprising the guitar, the keyboard and the drums as residual after separating the vocals from the audio input signal.

Confidence analysis may be for example, a real-time (online) estimation of the confidence level of the user. The confidence level may be calculated based on some factors, such as similarity to original vocals, pitch quality, timing or rhythm feel, professionality (i.e. vibrato, vocal range, etc.), singing lyrics or just humming and the like. The confidence analysis may for example comprise analyzing and comparing the user's voice signal to the original vocals signal in real time to calculate a confidence analysis result. The original vocals signal is the vocals signal obtained from the audio input signal after performing audio source separation.

A guidance to the user may be for example adjusting the level of the original recording's vocals in the upmix/remix by reducing the original recording's vocals, fully removing the original recording's vocals, keep unchanged the original recording's vocals, or the like. The amount of the vocal reduction (m the continuous range from 'no reduction' to 'full removal') may be adjusted adaptively, based on the confidence level of the user. The higher the confidence of the user, the more would the player effectively give them the vocal stage. A guidance to the user may also be an audio guidance, a visual guidance or the like.

The electronic device may for example address a large variety of scenarios and may be an online re active and a real time adaptive device.

The circuitry of the electronic device may for example be configured to obtain an adjusted vocals signal from the vocals signal and to perform mixing of the adjusted vocals signal with the accompaniment signal to obtain an adjusted audio signal for providing guidance to the user. The mixing may be a reactive real-time mixing of the adjusted vocals signal with the accompaniment signal to obtain an adjusted audio signal for providing guidance to the user.

The circuitry of the electronic device may for example be configured to play back the adjusted audio signal for providing guidance to the user. The audio signal may be adjusted online and may be played back in real-time. For example, a user who is a professional singer may lack the lyrics of the audio input, or may have a weak pitch perception, could be guided and supported with a mix of lowered original vocals and a visual guidance on how to correct the pitch, etc., and the like. Also, a feedback of performance, i.e. pitch quality, timing and professionality (reflected through vibrato, vocal range, etc.) may be provided as guidance to the user. In addition, guidance may be required during a small portion of a song, and therefore a quick and individually optimized reactiveness of the system may be essential.

The circuitry of the electronic device may for example be configured to perform a gain control on the vocals signal based on the confidence analysis to obtain the adjusted vocals signal.

The real-time confidence results may for example be used to control gain stages that determine how much of the original recording's vocals may be presented to the user at each moment. The gain may control the contribution of the original vocals to the mix, that is, the original vocals may be muted, the original vocals may be unchanged in the mix, or the like. The gain control may not be a binary system, i.e. the original vocals may be lowered without being removed entirely, depending on the online result of the confidence analysis. The level of the original vocals may be entirely controlled by the confidence analysis result, that is the confidence value. Low confidence may lead to unaltered playback and height confidence may lead to full removal of the original vocals. For example, the confidence value may be chosen to be high when a pitch error and/or a rhythm error is small, and vice versa. Alternatively, the confidence value may be chosen to be small when a pitch error and/or a rhythm error is small.

The circuitry of the electronic device may for example be configured to generate a guidance control signal based on the confidence analysis and to perform a visual or audio guidance based on the guidance control signal for providing guidance to the user. The guidance to the user may be visual guidance being displayed on a display unit. The visual guidance may be displaying of lyrics being stored in a readily available database, or to perform a lyrics extraction offline, displaying of intonation correction information, i.e. 'sing sharper' sing 'flatter' or using a gauge, displaying of pitch correction indicators (arrows or other), displaying of rhythm correction indicators (flashes or other), displaying feedback of performance, i.e. pitch quality, timing and professionality (reflected through vibrato, vocal range, etc. or the like.

In addition, the guidance to the user may be audio guidance being output to a loudspeaker system.

Audio guidance may be an advance presentation of the next line through voice feedback (Suffleur mode like in theatre). In the Acoustic guidance, the lyrics may be synthesized in spoken voice and may be output ahead of time to the user, or the like.

The audio guidance and visual guidance may be active until either the user's confidence value increases, for example, when the user's singing performance is improved, or until the user stops singing, where the system resumes normal playback.

The circuitry of the electronic device may for example be configured to perform pitch analysis on the vocals signal to obtain a vocals pitch analysis result, to perform a pitch analysis on the user's voice to obtain a user's pitch analysis result and to perform a vocals pitch comparison based on the vocals pitch analysis result and the a user's pitch analysis result to obtain a pitch error.

The pitch analysis maybe based on fundamental and harmonic frequencies in a spectrum. The vocals pitch comparison may comprise comparison of the user's voice pitch with original vocals pitch. The pitch analysis may be implemented based on time, frequency or time-frequency analysis.

The circuitry of the electronic device may for example be configured to perform rhythm analysis on the vocals signal to obtain a vocals rhythm analysis result, to perform a rhythm analysis on the user's voice to obtain a user's rhythm analysis result and to perform a vocals rhythm comparison based on the vocals rhythm analysis result and the user's rhythm analysis result to obtain a rhythm error. The rhythm analysis may be implemented based on time, frequency or time-frequency analysis and may comprise an energy onset detection.

The circuitry of the electronic device may for example be configured to perform a confidence estimation based on the pitch analysis result and based on the rhythm analysis result to obtain a confidence value.

The confidence value may be a confidence analysis result estimated in real time and may be used to control gain stages that determine how much of the original recording's vocals may be presented to the user at each moment. The confidence value may represent the similarity of the user's performance with that of the original artist, however, may also be configured with different weighting.

The circuitry of the electronic device may for example be configured to perform a confidence-to-gain mapping based on the confidence value to obtain a gain control signal.

The circuitry of the electronic device may for example be configured to perform a guidance logic based on the confidence value to obtain a guidance control signal. The guidance logic may control the audio guidance and the visual guidance. The guidance logic may also decide not to provide any guidance if either the combination of the confidence value and pitch and rhythm analysis result is high, or the guidance logic is otherwise configured. The guidance logic may control the display of the visual guidance or the output of the acoustic guidance.

The circuitry of the electronic device may for example be configured to perform voice activity detection on the user's voice signal to obtain a trigger signal that triggers the confidence analysis.

The voice activity detector (VAD) may be monitoring an audio environment around the user by means of a microphone. The voice activity detector may serve as a global processing on/off switch, for example based on if the user starts singing loud enough (i.e. higher than an internal reference threshold), then the voice activity detector may send a trigger to the confidence analyzer for further processing, and based on if the user stops singing or lowers his voice below a voice activity detector threshold, the voice activity detector may send another trigger to the confidence analyzer to adjust the gains to resort to ordinary playback.

In addition, a microphone or similarly recognizable symbol, or the like, in the player's graphical user interface (GUI) may be displayed on the display unit for example when the voice activity detector recognizes the user's performance, that is when the voice activity detector output the trigger signal.

According to an embodiment, the confidence analyzer may be further configured to provide guidance to the user based on the confidence value. The confidence analyzer may be also configured to provide guidance based on the pitch error, the rhythm error and the confidence value.

According to an embodiment, the confidence-to-gain mapping may be configured to set the gain control signal in such a way that the user receives no guidance if the user is singing in perfect pitch.

According to an embodiment, the audio input signal comprises a mono and/or stereo audio input signal or the audio input signal comprises an object-based audio input signal. The audio input signal may be a multichannel audio input signal. The object-based audio input signal may be a three-dimensional (3D) audio format signal.

The circuitry of the electronic device may for example be configured to perform echo cancellation on the user's voice to obtain an echo free user's voice.

The circuitry of the electronic device may for example be configured to perform a professional analysis on the vocals signal to obtain a vocals professional analysis result, to perform a professional analysis on the user's voice to obtain a user's professional analysis result. The professional analysis may be an analysis of vibrato, i.e. energy modulation spectrum, vocal range, etc., or the like.

According to an embodiment, the circuitry comprises a microphone configured to capture the user's vocals signal. A microphone or similarly recognizable symbol, or the like, in the player's graphical user interface (GUI) may be displayed on the display unit for example when the voice activity detector recognizes the user's performance.

The embodiments also disclose a method comprising performing audio source separation on an audio input signal to obtain a vocals signal and an accompaniment signal and performing confidence analysis on a user's voice based on the vocals signal to provide guidance to the user.

The embodiments also disclose a computer program comprising instructions, the instructions when executed on a processor causing the processor to perform the processes disclosed here.

Embodiments are now described by reference to the drawings.

Mono/Stereo Audio Signal Adjustment Based on Audio Source Separation and Confidence Analysis FIG. 1 schematically shows a process of audio adjustment of an audio signal based on audio source separation and confidence analysis.

An audio input signal x(n) containing multiple sources (see 1, 2, . . . , K in FIG. 2), such as a mono or stereo audio input 103 signal x(n), e.g. a piece of music, is input to a process of Music Source Separation 104 and decomposed into separations (see separated source 2 and residual signal 3 in FIG. 2), here into a separated source 2, namely "Vocals" $s_O(n)$, and a residual signal 3, namely "Accompaniment"

$s_A(n)$. An exemplary embodiment of the process of Music Source Separation 104 is de scribed in FIG. 2 below. The Vocals $s_O(n)$ are transmitted to a Confidence Analyzer 102 and a Gain 105. A User's microphone 100 acquires a User's voice s(n) and transmits the User's voice signal $s_V(n)$ to a Voice Activity Detector (VAD) 101 and the Confidence Analyzer 102. The Voice Activity Detector 101 processes a voice activity detection on the User's voice signal $s_U(n)$ to obtain a Trigger signal. The Trigger signal triggers a process of the Confidence Analyzer 102 based on the detected User's voice signal $s_U(n)$. A process of the Confidence Analysis 102 is performed on the User's voice signal $s_U(n)$ based on the Vocals $s_O(n)$, obtained from the audio input signal x(n), to obtain a Gain control signal g(n) and Guidance control signals 311. An exemplary embodiment of the Confidence Analyzer 102 is described in FIG. 3 below. Based on the Gain control signal g(n), the Gain 105 is applied to the Vocals $s_O(n)$ to obtain Adjusted Vocals $s'_O(n)$. A mixer 106 mixes the Adjusted Vocals $s'_O(n)$, obtained by the Gain 105, to the Accompaniment $s_A(n)$, obtained by the Music Source Separation 104, to obtain an adjusted audio signal $s''_O(n)$. The Confidence Analyzer 102 controls a Visual Guidance 107 and an Audio Guidance 108 based on the Guidance control signals 311 to obtain a Visual guidance signal and an Audio guidance signal respectively. The Visual Guidance 107 and the Audio Guidance 108 are performed based on the Guidance control signals 311 obtained from the Confidence Analyzer 102 and based on Lyrics 109 of a piece of music, here the mono or stereo audio input 103 signal x(n), being acquired from readily available data bases. Alternatively, If the song's metadata does not lead to a match, Lyrics 109 extraction is performed offline first. Based on the Visual guidance signal visual guidance is displayed on a Display Unit 110. Based on the Audio guidance signal acoustic guidance is output by a Loudspeaker system 111. The Visual Guidance 107 may be lyrics, pitch correction indication, rhythm orientation, or the like. The Audio Guidance 108 may be a 'Suffleur system', where the system utters the lyrics ahead of their temporal position in the piece (like in theatre). In this case the Lyrics 109 are synthesized in spoken voice and acoustically delivered ahead of time to the user.

At the Gain 105, a Gain control signal g(n) (Gain), is applied is applied to the vocals signal $s_O(n)$ to obtain adjusted vocals signal $s'_O(n)$, wherein $s'_O(n)=g(n) \times s_O(n)$.

In the embodiment of FIG. 1, audio source separation is performed on the audio input signal in realtime. For example, the audio input signal, such as an incoming stream or locally available song, is played back through a given playback system. The audio input signal is processed online through a vocal separation algorithm to extract and potentially remove the original vocals from the audio material. An example for real-time vocal separation is described in published paper Uhlich, Stefan, et al. "Improving music source separation based on deep neural networks through data augmentation and network blending." 2017 IEEE International Conference on Acoustics, Speech and Signal Processing (ICASSP) IEEE, 2017, wherein the bi-directional LSTM layers are replaced by unidirectional ones.

In the embodiment of FIG. 1, a reactive interaction with the user is provided, since the Confidence Analyzer 102, based on a subset of features calculated in its analysis stage, controls the system's guidance features, such as the Visual Guidance 107 and the Audio Guidance 108. The Visual Guidance 107 may include lyrics display, visual display of a current pitch quality (i.e. is the user 'sharp' or 'flat', and how to correct it, e.g. with arrows pointing up or down), triggered by a poor pitch performance, visual display of the lyrics, triggered by poor pitch and rhythm performance and visual rhythm feature to help the user keep time, which could be triggered by poor rhythm performance. The Audio Guidance 108 may include a 'Souffleur' mode, which would rely on text-to-voice algorithms, triggered by poor pitch and rhythm performance. Alternatively, the Confidence Analyzer 102 may decide not to provide any guidance if either the combination of Confidence Value $e_{tot}(n)$ 407 and pitch and rhythm data is sufficiently high or if the Confidence Analyzer 102 is otherwise configured.

Moreover, as described in the embodiment of FIG. 1, a process of a voice activity detector (VAD) is performed on the user's voice signal to detect the presence or absence of a voice signal. The voice activity detector is monitoring an audio environment around the user by means of a microphone. The VAD can be implemented as described in published papers D. Ortiz P. et al 2016 J. Phys.: Conf. Ser. 705 012037 and hang Bai et al 2017 IOP Conf. Ser.: Mater. Sci. Eng. 231 012042, without limiting the present disclosure in that regard. Alternatively, the VAD can be implemented using any voice activity detection method known to the skilled person. The VAD can perform as a global processing on/off switch, based on whether the user starts singing loud enough and whether the stops singing or lowers his voice below a VAD threshold. For example, if the user starts singing loud enough, i.e. higher than an internal reference threshold, the VAD generates a trigger signal to the Confidence Analyzer 102 for further processing, as already been described above. If the user stops singing or lowers his voice below the internal reference threshold, the VAD generates another trigger signal to the Confidence Analyzer 102 to adjust the gains to resort to ordinary playback.

Figure 2:
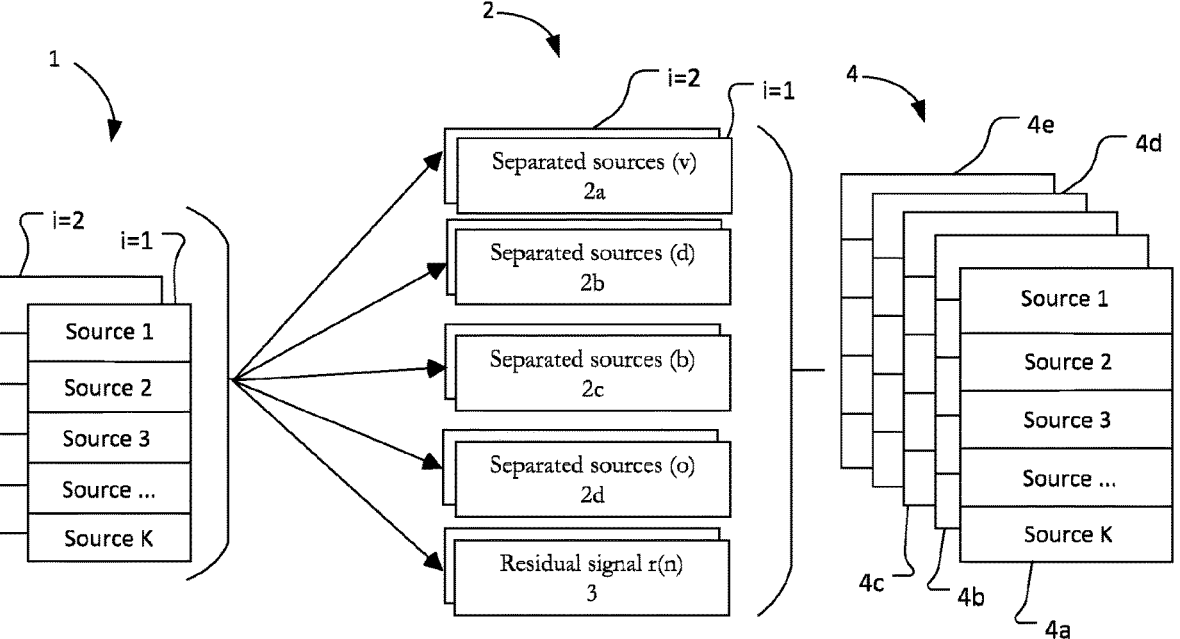
FIG. 2 schematically shows a general approach of audio upmixing/remixing by means of blind source separation (BSS), such as music source separation (MSS)

Simultaneously, when the VAD sends a trigger, i.e. the system recognizes the user's performance, then the system displays a microphone (or similarly recognizable symbol) in the player's graphical user interface (GUI), to notify the user that the system is either active or idling based on the VAD's output Audio Remixing/Upmixing by Means of Audio Source Separation FIG. 2 schematically shows a general approach of audio upmizing/remixing by means of blind source separation (BSS), such as music source separation (MSS).

First, audio source separation (also called "demixing") is performed which decomposes a source audio signal 1, here audio input signal x(n), comprising multiple channels I and audio from multiple audio sources Source 1, Source 2, . . . , Source K (e.g. instruments, voice, etc.) into "separations", here separated source 2, e.g. vocals $s_O(n)$, and a residual signal 3, e.g. accompaniment $s_A(n)$, for each channel i, wherein K is an integer number and denotes the number of audio sources. The residual signal here is the signal obtained after separating the vocals from the audio input signal. That is, the residual signal is the "rest" audio signal after removing the vocals for the input audio signal. In the embodiment here, the source audio signal 1 is a stereo signal having two channels i=1 and i=2. Subsequently, the separated source 2 and the residual signal 3 are remixed and rendered to a new loudspeaker signal 4, here a signal comprising five channels 4a-4e, namely a 5.0 channel system. The audio source separation process (see 104 in FIG. 1) may for example be implemented as described in more detail in published paper Uhlich, Stefan, et al. "Improving music source separation based on deep neural networks through data augmentation and network blending." 2017 IEEE International Conference on Acoustics, Speech and Signal Processing (ICASSP). IEEE, 2017.

As the separation of the audio source signal may be imperfect, for example, due to the mixing of the audio sources, a residual signal 3 (r(n)) is generated in addition to the separated audio source signals 2a-2d. The residual signal may for example represent a difference between the input audio content and the sum of all separated audio source signals. The audio signal emitted by each audio source is represented in the input audio content 1 by its respective recorded sound waves. For input audio content having more than one audio chanty-1, such as stereo or surround sound input audio content, also a spatial information for the audio sources is typically included or represented by the input audio content, e.g. by the proportion of the audio source signal included in the different audio channels. The separation of the input audio content 1 into separated audio source signals 2a-2d and a residual 3 is performed based on blind source separation or other techniques which are able to separate audio sources.

In a second step, the separations 2a-2d and the possible residual 3 are remixed and rendered to a new loudspeaker signal 4, here a signal comprising five channels 4a-4e, namely a 5.0 channel system. Based on the separated audio source signals and the residual signal, an output audio content is generated by mixing the separated audio source signals and the residual signal taking into account spatial information. The output audio content is exemplary illustrated and denoted with reference number 4 in FIG. 2.

In a second step, the separations and the possible residual are remixed and rendered to a new loudspeaker signal 4, here a signal comprising five channels 4a-4e, namely a 5.0 channel system. Based on the separated audio source signals and the residual signal, an output audio content is generated by mixing the separated audio source signals and the residual signal on the basis of spatial information. The output audio content is exemplary illustrated and denoted with reference number 4 in FIG. 2.

Confidence Analysis Process Based on Source Separation

Figure 3:
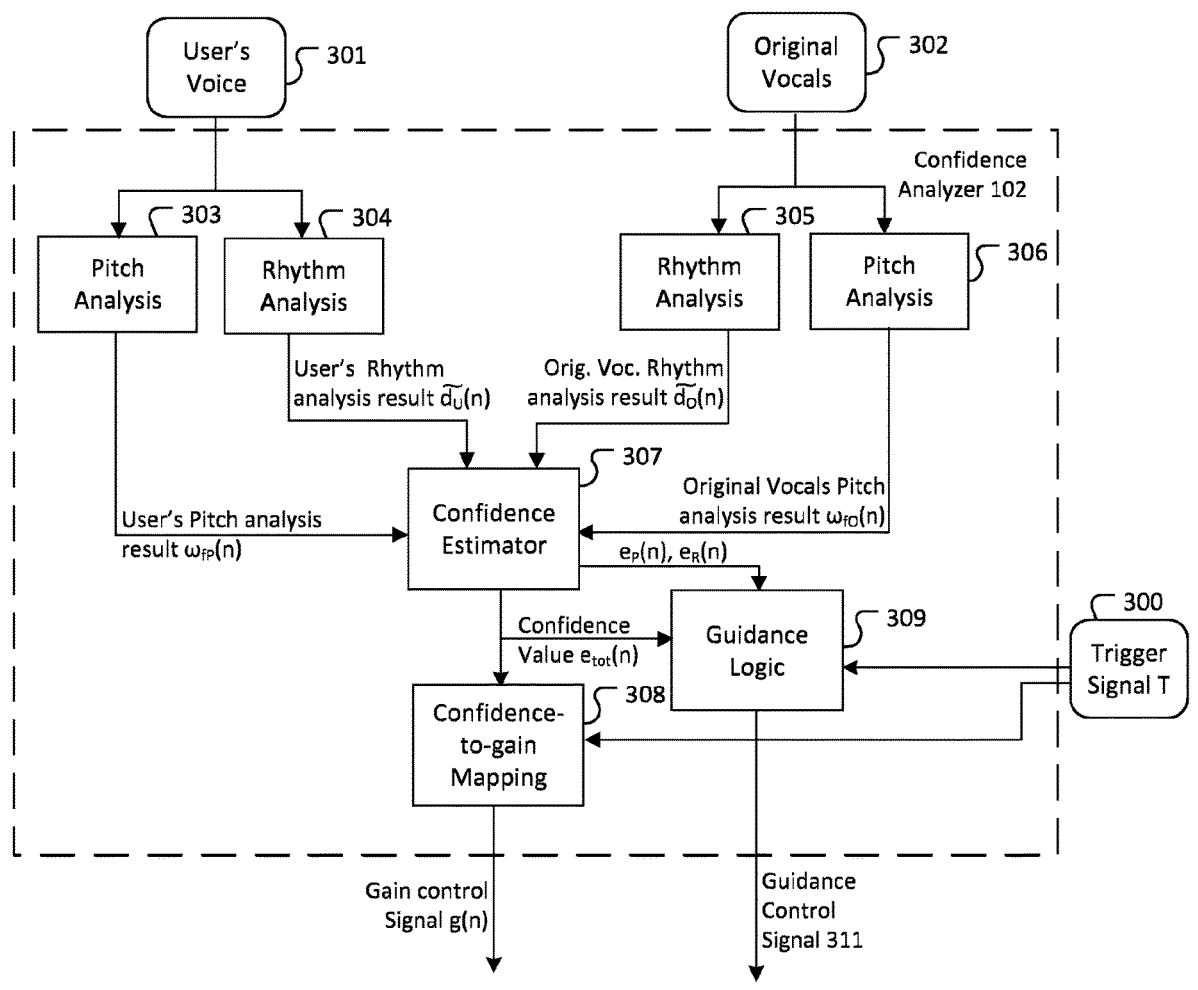
FIG. 3 schematically describes in more detail an embodiment of a process of the Confidence Analyzer performed in the process of audio signal adjustment as described in FIG. 1.

FIG. 3 schematically describes in more detail an embodiment of a process of the Confidence Analyzer performed in the process of audio signal adjustment as described in FIG. 1 above. A Pitch Analysis 303 is performed on the User's Voice 301, to obtain a User's Pitch analysis result $\omega_{fU}(n)$ and a Rhythm Analysis 304 is performed on the User's Voice 301, to obtain a User's Rhythm analysis result $\tilde{d}_U(n)$. A Rhythm Analysis 305 is performed on the Original Vocals 302, to obtain an Original Vocals Rhythm analysis result $\tilde{d}_O(n)$, and a Pitch Analysis 306 performed on the Original Vocals 302, to obtain an Original Vocals Pitch analysis result $\omega_{fO}(n)$. A process of a Confidence Estimator 307 is performed on the Pitch analysis results $\omega_{fO}(n)$, $\omega_{fU}(n)$ and the Rhythm analysis results $\tilde{d}_U(n)$, $\tilde{d}_O(n)$ of both User's Voice 301 and Vocals 302, to obtain a Confidence Value $e_{tot}(n)$ 407. A Trigger Signal T 300 obtained by the Voice Activity Detector 101 (see FIG. 1) triggers a Confidence-to-gain Mapping (308) is to be performed based on the confidence value $e_{tot}(n)$ to obtain a gain control signal (407). The Confidence-to-gain Mapping 308 maps the Confidence Value $e_{tot}(n)$ 407 to a gain value. That is, based on the result of the Confidence Estimator 307, e.g. the Confidence Value $e_{tot}(n)$ 407, the Confidence Analyzer 102 determines the Gain g(n) on the Confidence-to-gain Mapping 308. A process of a Guidance Logic 309 is performed based on the Confidence Value $e_{tot}(n)$ 407 and based on a Pitch error $e_P(n)$ and a Rhythm error $e_R(n)$ (see FIG. 4), to obtain a Guidance Control signal 311. The Guidance Logic 309 based on its settings, controls guidance features, such as Visual Guidance 107 (see FIG. 1) and Audio Guidance 108 (see FIG. 1). The Guidance Logic 309 provides guidance to the user, using the Visual Guidance 107 and the Audio Guidance 108 based on the Confidence Value $e_{tot}(n)$ 407, the Pitch error $e_P(n)$ and the Rhythm error $e_R(n)$. For example, if the Pitch error $e_P(n)$ is high, a visual guidance is provided to the user, e.g. a message, regarding display of intonation correction information, is displayed on the Display Unit 110, such as, i.e. 'sing sharper', sing 'flatter' or using a gauge, or the like. Additionally, a feedback of the user's performance can be displayed on the Display Unit 110, regarding the pitch quality, the timing and the professionality of the user's performance, which may be reflected through vibrato, vocal range, etc.

As described in the embodiment of FIG. 3, the Guidance Logic 309 provides guidance to the user, based on the Confidence Value $e_{tot}(n)$ 407, the Pitch error $e_P(n)$ and the Rhythm error $e_R(n)$, using the Visual Guidance 107 and the Audio Guidance 108, without limiting the present embodiment to that regard.

Alternatively, the Guidance Logic 309 may provide the necessary guidance to the user, based on use's settings, for example, the user may require guidance regarding the lyrics, or pitch guidance, or rhythm guidance, or any combination of the former. For example, experienced singers who may choose to alter the melody can remove from the Confidence Analyzer 102, the setting regarding the pitch analysis, the rhythm analysis, or the like, such that it is not falsely recognized a poor performance. Also, not experienced singers may use the Visual Guidance 107 and the Audio Guidance 108, or train different aspects of their singing by activating desirable guidance.

Still alternatively, the Guidance Logic 309 may also decide not to provide any guidance if either the combination of the Confidence Value $e_{tot}(n)$ 407 and pitch and rhythm data, such as the Pitch error $e_P(n)$ and a Rhythm error $e_R(n)$, are sufficiently high, or the Guidance Logic 309 is otherwise configured.

The Trigger signal T 300, which triggers the Confidence Analyzer for further processing, is implemented as a flag, a binary ON/OFF signal that serves as a global processing ON/OFF switch. In the case where the Trigger signal T 300 is ON, the Trigger signal T triggers the Guidance Logic 309 to control the display of a microphone or similarly recognizable symbol, in a user's graphical user interface (GUI), such as the display unit 110 (see FIG. 1). In the case where the Trigger signal T 300 is OFF, the Trigger signal T triggers the Confidence-to-gain Mapping 308 to set the g(n)=1. In other words, no user's voice is detected and the original vocals $s_O(n)$ remains unchangeable in the adjusted audio signal $s''_O(n)$, that is the ordinary playback is resorted.

In the embodiment of FIG. 3, a reactive interaction with the user is provided, since the Guidance Logic 309, based on a subset of features calculated in its analysis stage, controls the system's guidance features, such as the Visual Guidance 107 and the Audio Guidance 108. Thus, the Guidance Logic 309 controls the display or playback of visual or acoustic guidance features, respectively. For example, visual guidance features may be Lyrics (see 109 in FIG. 1), Pitch correction indicators (arrows or other), and Rhythm correction indicators (flashes or other), or the like. Acoustic guidance features may for example be delivered in the manner of a "Souffleur" in theatre, or the like. The lyrics (see 109 in FIG. 1) may be synthesized in spoken voice and acoustically delivered ahead of time to the user. The lyrics may be acquired from readily available databases, or a lyrics extraction may be first performed offline, if song's metadata does not lead to a stored match.

As described above, the Confidence Analyzer 102 analyzes and compares the user's signal $s_U(n)$ to the Original Vocals $s_O(n)$ in real time to create a Confidence Value $e_{tot}(n)$ 407. The instantaneous confidence results are then used to control the gain 105 stages that determine how much of the original recording's vocals is presented to the user at that moment. The system's configurability makes the system adaptable to all levels of singers. For example, experienced singers who may choose to alter the melody can remove the pitch analysis from the confidence analysis etc., so that the system does not falsely recognize a poor performance and reintroduces the original voice. At the same time, beginners can go all-out on the guidance features, or simply train different aspects by activating only certain parts of the features.

Figure 4:
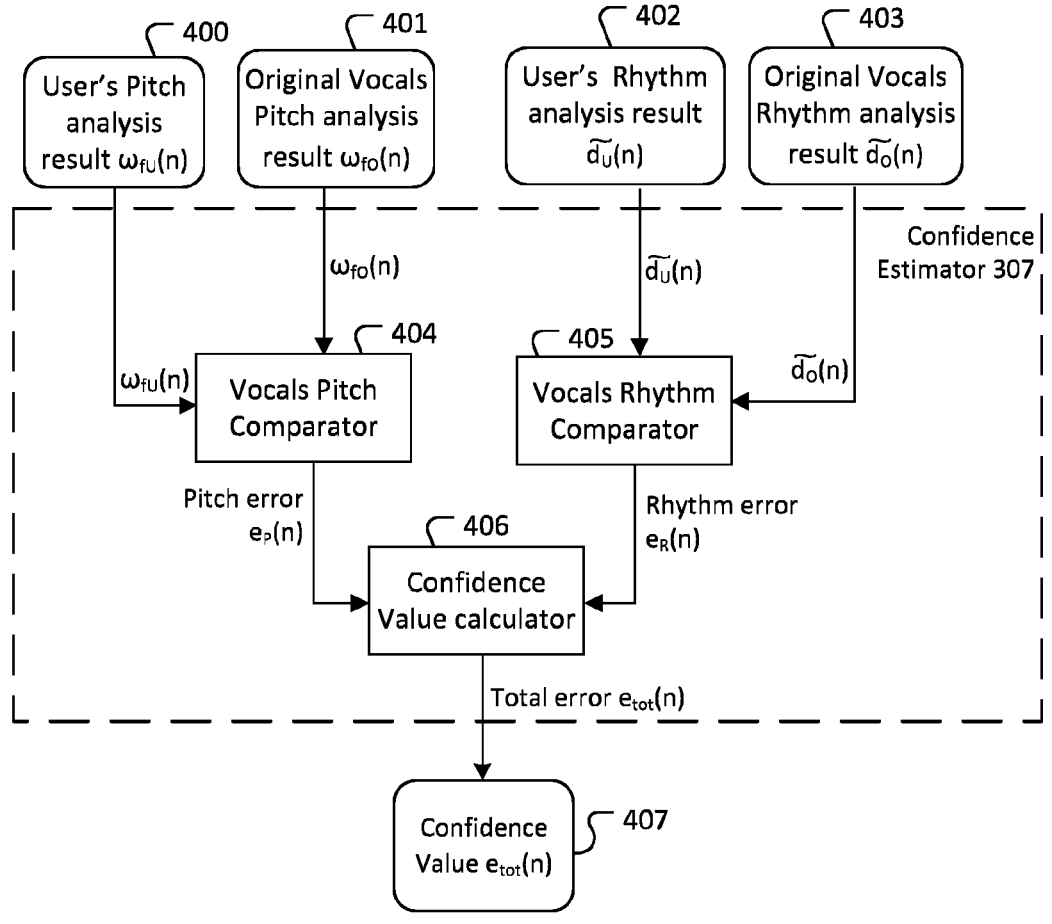
FIG. 4 shows in more detail an embodiment of a process of a Confidence Estimator performed in the process of Confidence Analyzer as described in FIG. 3.

FIG. 4 shows in more detail an embodiment of a process of a Confidence Estimator performed in the process of Confidence Analyzer as described in FIG. 3 above. A Vocals Pitch Comparator 404 process is performed on the User's Pitch analysis result $\omega_{fU}(n)$ 400, obtained by the Pitch Analysis 303 (see FIG. 3), and on the Original Vocals Pitch analysis result $\omega_{fO}(n)$ 401, obtained by the Pitch Analysis 306 (see FIG. 3), to obtain a Pitch error $e_P(n)$. Simultaneously, a Vocals Rhythm Comparator 405 process is performed on the User's Rhythm analysis result $d_U(n)$, obtained by the Rhythm Analysis 304 (see FIG. 3), and on the Original Vocals Rhythm analysis result $d_O(n)$, obtained by the Rhythm Analysis 305 (see FIG. 3), to obtain a Rhythm error $e_R(n)$. A Confidence Value calculator 406 process is performed on both the Pitch error $e_P(n)$ and the Rhythm error $e_R(n)$ to obtain a Confidence Value $e_{tot}(n)$ 407. Subsequently, the Confidence Value calculator 406 merges the Pitch error $e_P(n)$ and the Rhythm error $e_R(n)$ to one value, here the Confidence Value $e_{tot}(n)$ 407. The Pitch error $e_P(n)$ and the Rhythm error $e_R(n)$ should be transformed into values having comparable units with each other in order the Confidence Value calculator 406 to merge them into one value e.g. the Confidence Value $e_{tot}(n)$ 407.

The Confidence Value calculator 406 merges the Pitch error $e_P(n)$ and the Rhythm error $e_R(n)$ to one value, here the Confidence Value $e_{tot}(n)$ 407. The Confidence Value calculator 406 weights the Pitch error $e_P(n)$ and the Rhythm error $e_R(n)$ using different weights, depending on the importance of the Pitch error $e_P(n)$ and the Rhythm error $e_R(n)$, respectively, on the overall audio signal, to obtain the Confidence Value $e_{tot}(n)$ 407. The Confidence Value $e_{tot}(n)$ 407 may be calculated using a weighting function:

$$e_{tot}(n)=Ae_P(n)+Be_R(n)$$

where $e_P(n)$ is the Pitch error, $e_R(n)$ is the Rhythm error and A, B are the weights, where A, B may be equal weights, or may not be equal weights. For example, A, B are independent and can either be zero or real-positive.

The comparison with the original vocals ultimately leads to the confidence value, whose calculation can be configured through the Confidence Estimator 307 that combines the various analyses' results. The confidence value represents the similarity of the user's performance with that of the original artist, without limiting the present disclosure in that regard. Alternatively, the confidence value may also be calculated using different weighting.

In the present embodiment, the level of the Confidence Value $e_{tot}(n)$, which reflects the level of the error, namely the Pitch error $e_P(n)$, and the Rhythm error $e_R(n)$, is chosen to be small when the error is small and vice versa, without limiting the present embodiment in that regard. Alternatively, the Confidence Value $e_{tot}(n)$, may be chosen to be high when the Pitch error $e_P(n)$, the Rhythm error $e_R(n)$ are small.

Pitch Analysis

Figure 5A:
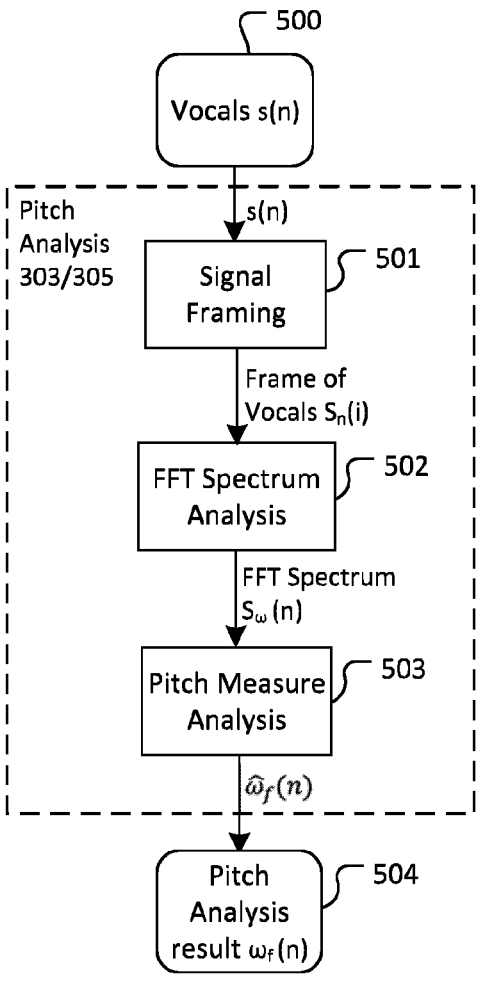
FIG. 5a shows in more detail an embodiment of a process of Pitch Analysis performed in the process of Confidence Analyzer as described in FIG. 3.

FIG. 5a shows in more detail an embodiment of a process of Pitch Analysis performed in the process of Confidence Analyzer as described in FIG. 3 above. As described in FIG. 3, a Pitch Analysis 303 and 305 is performed on the User's Voice 301 and the Original Vocals 302, respectively, to obtain a Pitch analysis result $\omega_f$. In particular, a process of Signal Framing 501 is performed on Vocals 500, namely on a Vocals signal s(n), to obtain Framed Vocals $S_n(i)$. A process of Fast Fourier Transform (FFT) Spectrum Analysis 502 is performed on the Framed Vocals $S_n(i)$ to obtain the FFT Spectrum $S_\omega(n)$. A Pitch measure Analysis 503 is performed on the FFT Spectrum $S_\omega(n)$ to obtain a Pitch Measure Result $R_P(\omega_f)$.

At the Signal Framing 501, a windowed frame, such as the Framed Vocals $S_n(i)$ can be obtained by $$S_n(i) = s(n+i)h(i)$$

where s(n+i) represents the discretized audio signal (i representing the sample number and thus time) shifted by n samples, h(i) is a framing function around time n (respectively sample n), like for example the hamming function, which is well-known to the skilled person.

At the FFT Spectrum Analysis 502, each framed Vocals is converted into a respective short-term power spectrum. The short-term power spectrum $S(\omega)$ as obtained at the Discrete Fourier transform, also known as magnitude of the short-term FFT, which may be obtained by $$|S_\omega(n)| = \left| \sum_{i=0}^{N-1} S_n(i) e^{-\frac{j2\pi\omega i}{N}} \right|$$

where $S_n(i)$ is the signal in the windowed frame, such as the framed Vocals $S_n(i)$ as defined above, w are the frequencies in the frequency domain, $|S_\omega(n)|$ are the components of the short-term power spectrum $S(\omega)$ and N is the numbers of samples in a windowed frame, e.g. in each framed Vocals.

The Pitch measure Analysis 503 may for example be implemented as described in the published pa per Der-Jenq Liu and Chin Teng Lin, "Fundamental frequency estimation based on the joint time-frequency analysis of harmonic spectral structure" in IEEE Transactions on Speech and Audio Processing, vol. 9, no. 6, pp. 609-621, September 2001:

A Pitch measure $R_P(\omega_f)$ is obtained for each fundamental-frequency candidate $\omega_f$ from the power spectral density $S_\omega(n)$ of the frame window $S_n$ by $$R_P(\omega_f) = R_E(\omega_f) R_I(\omega_f)$$

where $R_E(\omega_f)$ is the energy measure of a fundamental-frequency candidate $\omega_f$, and $R_I(\omega_f)$ is the impulse measure of a fundamental-frequency candidate $\omega_f$.

The energy measure $R_E(\omega_f)$ of a fundamental-frequency candidate $\omega_d$ is given by $$R_E(\omega_f) = \frac{\sum_{l=1}^{K(\omega_f)} h_{in}(l\omega_f)}{E}$$

where $K(\omega_f)$ is the number of the harmonics of the fundamental frequency candidate $\omega_f$, $h_{in}(n\omega_f)$ is the inner energy related to a harmonic $l\omega_f$ of the fundamental frequency candidate $\omega_f$, and E is the total energy, where $$E = \int_0^\infty S_\omega(n) d\omega.$$

The inner energy $$h_{in}(\omega_f) = \int_{\omega_f - w_{in}/2}^{\omega_f + w_{in}/2} S_\omega(n) d\omega$$

is the area under the curve of spectrum bounded by an inner window of length $w_{in}$ and the total energy is the total area under the curve of the spectrum.

The impulse measure $R_I(\omega_f)$ of a fundamental-frequency candidate $\omega_f$ is given by $$R_I(\omega_f) = \frac{\sum_{l=1}^{K(\omega_f)} h_{in}(l\omega_f)}{\sum_{l=1}^{K(\omega_f)} h_{out}(l\omega_f)}$$

where $\omega_f$ is the fundamental frequency candidate, $K(\omega_f)$ is the number of the harmonics of the fundamental frequency candidate $\omega_f$, $h_{in}(l\omega_f)$ is the inner energy of the fundamental frequency candidate, related to a harmonic $n\omega_f$ and $h_{out}(l\omega_f)$ is the outer energy, related to the harmonic $l\omega_f$.

The outer energy $$h_{out}(n\omega_f) = \int_{\omega_f - w_{out}/2}^{\omega_f + w_{out}/2} S_\omega(n) d\omega$$

is the area under the curve of spectrum bounded by an outer window of length $w_{out}$.

The Pitch Analysis Result $\hat{\omega}_f(n)$ for frame window $S_n$ is obtained by $$\hat{\omega}_f(n) = \arg_{\omega_f}^{max} R_P(\omega_f)$$

where $\hat{\omega}_f(n)$ is the fundamental frequency for window S(n), and $R_P(\omega_f)$ is the Pitch measure for fundamental frequency candidate $\omega_f$ obtained by the Pitch Measure Analysis 503, as described above.

The fundamental frequency $\hat{\omega}_f(n)$ at sample n is the Pitch Measurement Result that indicates the pitch of the vocals at sample n in the vocals signal s(n).

A Pitch Analysis process as described with regard to FIG. 5a above is performed on the User's Voice signal $s_U(n)$ 301 to obtain a User's Pitch analysis result to $\omega_{fU}(n)$ 400 and on the Original Vocals signal $s_O(n)$ 302 to obtain an Original Vocals Pitch analysis result $\omega_{fO}(n)$ 401.

In the embodiment of FIG. 5a, it is proposed to perform pitch measure analysis, such as the Pitch measure Analysis 503, for estimating the fundamental frequency $\omega_f$ based on FFT-spectrum. Alternatively, the fundamental frequency $\omega_f$ may be estimated based on a Fast Adaptive Representation (FAR) spectrum algorithm, without limiting the present disclosure to that regard.

It is to be noted that the Pitch measure Analysis 503 process may also be implemented as described in published papers Yukara Ikemiya, Katsutoshi Itoyama, Kazuyoshi Yoshii, "Singing Voice Separation and Vocal F0 Estimation Based on Mutual Combination of Robust Principal Component Analysis and Subharmonic Summation", in IEEE/ACM Transactions on Audio, Speech, and Language Processing, Vol. 24, No. 11, November 2016, Der-Jenq Liu and Chin-Teng Lin, "Fundamental frequency estimation based on the joint time-frequency analysis of harmonic spectral structure," in IEEE Transactions on Speech and Audio Processing, vol. 9, no. 6, pp. 609-621, September 2001, Alain de Cheveigne, Hideki Kawahara, "Yin, a fundamental frequency estimator for speech and music", J. Acoust. Soc. Am., 111 (4) (2002), Lane, John E. "Pitch detection using a tunable IIR filter." *Computer Music Journal* 14.3 (1990): 46-59, and Cecilia Jarne, "A method for estimation of fundamental frequency for tonal sounds inspired on bird song studies", MethodsX, Volume 6, Pages 124-131, 2019.

Figure 5B:
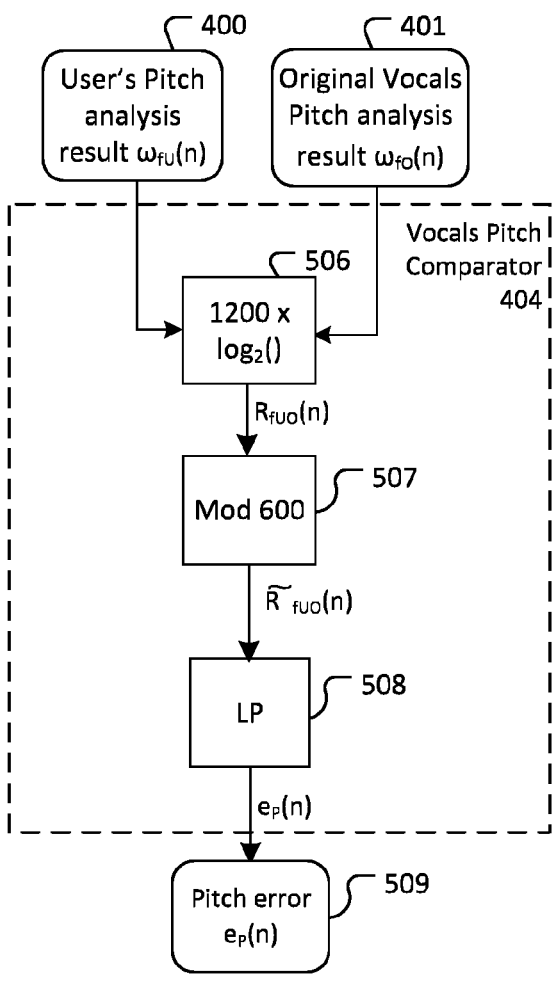
FIG. 5b shows in more detail an embodiment of a process of a Vocals Pitch Comparator performed in the process of Confidence Estimator as described in FIG. 4.

FIG. 5*b* shows in more detail an embodiment of a process of a Vocals Pitch Comparator performed in the process of Confidence Estimator as described in FIG. 4 above. Based on the Original Vocals Pitch analysis result $\omega_{fO}(n)$ and the User's Pitch analysis result $\omega_{fU}(n)$, a Vocals Pitch Comparator 404 process is performed, as described in FIG. 4.

In particular, the Vocals Pitch Comparator 404 transforms the Pitch error $e_P(n)$ (see FIGS. 4 and 5*a*) into an error value, for example, a cent, which is a logarithmic unit of measure used for musical intervals. A music interval is a difference in pitch between two sound signals, here the music interval is equal to the Pitch error $e_P(n)$. For example, to compare different frequencies, namely the User's Pitch analysis result $\omega_{fU}(n)$ with the Original Vocals Pitch analysis result $\omega_{fO}(n)$, it is possible to calculate the ratio between the two frequencies $\omega_{fU}(n)$. $\omega_{fO}(n)$ as frequency ratio R:

$$R_{f_{UO}}(n) = 1200 \cdot \log_2\left(\frac{\omega_{fU}(n)}{\omega_{fO}(n)}\right)$$

This determination 506 of the frequency ratio $R_{f_{UO}}(n)$ expresses the difference between the two frequencies in the unit of measure "cents". The "cent" is known to the skilled person as a unit of measure for the ratio between two frequencies. An equally tempered semitone (the interval between two adjacent piano keys) spans 100 cents by definition. An octave (two notes which have a frequency ratio of 2:1) spans twelve semitones and therefore 1200 cents.

The relationship between musical intervals and the frequency ratio in cents, is given by the following Table:

| Cents | Musical Intervals |
| --- | --- |
| 0 | Unison |
| 100 | Minor second |
| 200 | Major second |
| 300 | Minor third |
| 400 | Major third |
| 500 | Perfect fourth |
| 600 | Diminished fifth |
| 700 | Perfect fifth |
| 800 | Minor sixth |
| 900 | Major sixth |
| 1000 | Minor seventh |
| 1100 | Major seventh |
| 1200 | Octave |

For example, in a case where the difference between the Original Vocals Pitch and the Users' Voice Pitch, e.g. the cent is R=300, then the musical interval between the two voices is a Minor third. That is, in the case where the Original Vocals Pitch and the Users' Voice Pitch differs by 300 cents, their difference is three semitones. In the case where the Original Vocals Pitch and the Users' Voice Pitch differs by R=100, their difference is one semitone. In the case where the Original Vocals Pitch and the Users' Voice Pitch differs by R=1200, their difference is twelve semitones, namely one Octave. In other words, the higher the difference between the frequencies, the higher the musical interval size. Accordingly, the frequency ratio R expressed in cents as described above is an appropriate measure for the pitch error $e_P(n)$ made by the user as compared to the original vocals.

The ratio $R_{f_{UO}}(n)$ between the two frequencies $\omega_{fU}(n)$, $\omega_{fO}(n)$, using the above equation, is negative (−) when $\omega_{fU}(n)<\omega_{fO}(n)$, that is, when the user signs lower than the original vocals and the frequency ratio $R_{f_{UO}}(n)$ is positive (+) when $\omega_{fU}(n)>\omega_{fO}(n)$, that is, when the user signs higher than the original vocals.

Subsequently, a modulo-600 operation 507 is performed on the frequency ratio $R_{f_{UO}}(n)$ to obtain a reduced frequency ratio $\tilde{R}_{f_{UO}}(n)$. The integer number 600 represents the musical interval of six semitones. The modulo operation finds the (signed) remainder after division of one number (here: the frequency ratio $R_{f_{UO}}(n)$) by another (here 600). The result of the modulo operation is called the modulus of the operation. The modulo-600 operation 507 which operates on the frequency ratio $R_{f_{UO}}(n)$ serves to ensure that the reduced frequency ratio $\tilde{R}_{f_{UO}}(n)$ will stay within half an octave. In this way, the user does not necessarily have to sing in the same octave as the original vocals. For example, when a man tries to sing the part of a woman exactly one octave lower than the original (female) vocals then the reduced frequency ration $R_{f_{UO}}(n)$ and, respectively, the resulting pitch error $e_P(n)$ will be zero, despite that the man is singing 12 semitones lower (1200 mod 600=0) than the woman.

Finally, a Low Pass filter (LP) 508 is performed on the reduced frequency ratio if $\tilde{R}_{UO}(n)$ to obtain a Pitch Error $e_P(n)$ 509.

The Low Pass filter 508 can be a causal discrete-time low-pass Finite Impulse Response (FIR) filter of order M given by $$\delta(n) = \sum_{i=0}^{M} a_i \tilde{R}_{f_{UO}}(n - i)$$

where $\tilde{R}_{f_{UO}}(n)$ is the reduced frequency ratio, $a_i$ is the value of the impulse response at the $i^{th}$ instant for 0≤i≤M. In this causal discrete-time FIR filter $\tilde{\delta}(n)$ of order M, each value of the output sequence is a weighted sum of the most recent input values.

The filter parameters M and $a_i$ can be selected according to a design choice of the skilled person. For example, $a_0=1$ for normalization purposes and M=0.5 sec, or M=1 sec.

Rhythm Analysis Based on Beat Comparison

Figure 6:
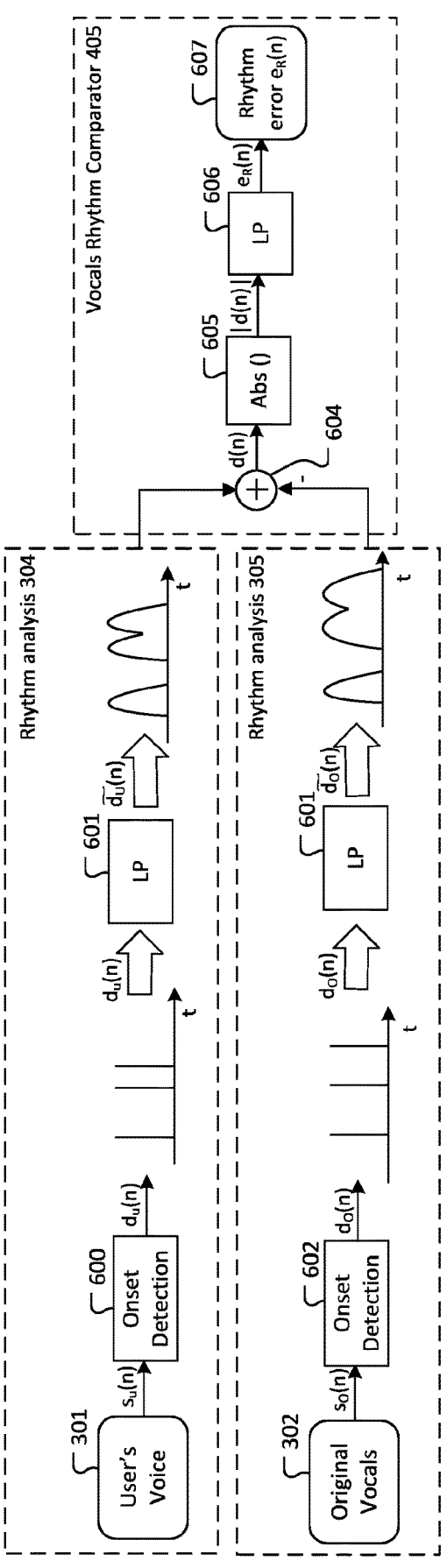
FIG. 6 shows in more detail an embodiment of a process of Rhythm Analysis performed in the process of Confidence Analyzer as described in FIG. 3.

FIG. 6 shows in more detail an embodiment of a process of Rhythm Analysis performed in the Confidence Analyzer as described in FIG. 3 above. A Rhythm Analysis 304 process is performed on the User's Voice $s_U(n)$ 301 to obtain a User's Rhythm analysis result $\tilde{d}_U(n)$, as described in FIG. 3. Onset Detection 600 is performed on the User's Voice $s_U(n)$ to obtain an onset detection signal $d_U(n)$ which indicates the attack phases of User's Voice 301 signal $d_U(n)$. For example, the onset detection signal, according to this embodiment may be a binary signal, which indicates the start of a sound. Subsequently, a Low Pass filter 601 is performed on the User's Voice 301 signal $d_U(n)$ to obtain a User's Rhythm analysis result $\tilde{d}_U(n)$, which is a smoothed version of the detection signal $d_U(n)$.

A Rhythm Analysis 305 process is performed on the Original Vocals $s_O(n)$ 302 to obtain an Original Vocals Rhythm analysis result $\tilde{d}_O(n)$, as described in FIG. 3. Onset Detection 602 is performed on the Original Vocals $s_O(n)$ to obtain an onset detection signal $d_O(n)$ which indicates the attack phases in the Original Vocals $s_O(n)$. The onset detection signal, according to this embodiment, is a binary signal, which indicates the start of a sound.

Subsequently, a Low Pass filter 601 is performed on both the Original Vocals $s_O(n)$ 302 signal, to obtain an Original Vocals Rhythm analysis result $\tilde{d}_O(n)$, which is a smoothed version of the detection signal $d_O(n)$.

Any state of the art onset detection algorithm known to the skilled person, which runs on the separated output (e.g. the Original Vocals 302 and the user's voice 301) of the source separation (104 in FIG. 1), can be used to gain insight of the correct onset signal, such as for example, the published paper Bello, J. P., Daudet, L, Abdallah, S., Duxbury, C., Davies, M., & Sandler, M. B. (2005). "A tutorial on onset detection in music signals." IEEE Transactions on Speech and Audio Processing, 13(5), 1035-1047. https://doi.org/10.1109/tsa.2005.851998. Based on the Onset Detection 600 and 602, an onset diagram is obtained for both the User's Voice 301 signal and the Original Vocals 302 signal. The peaks detected form the onset detection are visualized with vertical lines on the diagram. These peaks can be pulses having a certain width as described in published paper Cheng, Xiaowen & Hart, Jarod & Walker, James. (2009). "Time-frequency Analysis of Musical Rhythm." Notices of the American Mathematical Society. 56.

As in the Pitch Analysis process of FIG. 5b, the Low Pass filter 601 used in the User's Voice Rhythm analysis 303 and in the Original Vocals Rhythm analysis 305, can be a low-pass Finite Impulse Response (FIR) filter given by $$\tilde{\delta}(n) = \sum_{i=0}^{M} a_i d(n-i)$$

when d(n) is the onset detection signal, $a_i$ is the value of the impulse response at the $i^t$ instant for $0 \leq i \leq M$ of an $M^{th}$ order FIR filter. The filter parameters M and $a_i$ can be selected according to a design choice of the skilled person. For example, $a_0=1$ for normalization purposes, and 0.1 secs$\leq$M$\leq$0.3 sec.

Subsequently, based on the Original Vocals Rhythm analysis result $\tilde{d}_O(n)$ and the User's Rhythm analysis result $\tilde{d}_U(n)$, a Vocals Rhythm Comparator 405 process is performed, as described in FIG. 4. In particular, a mixer 604 integrates the two signals, namely the Original Vocals signal $d_O(n)$ and the inverted User's Voice signal $d_U(n)$ to obtain a mixed signal d(n) that represents their difference. Then an Absolute 605 operation is performed on the mixed signal d(n) to obtain an Absolute value |d(n)|. Then a second Low Pass filter 606 is performed on the Absolute value |d(n)| to obtain a Rhythm Error $e_R(n)$ 607. The second Low Pass filter 606 is the same as the Low Pass FIR filter 601 described above.

In the embodiment of FIG. 6, a Rhythm analysis is performed based on low pass filtering, as also described in the published paper Bello, J. P., Daudet, L, Abdallah, S., Duxbury, C., Davies, M., & Sandler, M. B. (2005). "A tutorial on onset detection in music signals" IEEE Transactions on Speech and Audio Processing, 13(5), 1035-1047. https://doi.org/10.1109/tsa.2005.851998.

Acoustic Echo Cancellation

An Acoustic Echo Cancellation (AEC) process removes echoes, reverberation from a signal that passes through an acoustic space. A sound coming from a user speaking, known as the Far End In, is sent in parallel to a Digital Signal Processor (DSP) path and to an acoustic path. The acoustic path consists of an amplifier, here Amplifier 704, and a loudspeaker, here Loudspeaker system 111, an acoustic environment, and a microphone, here User's microphone 100, returning the signal to the DSP. The AEC process is based on an adaptive finite impulse response (FIR) filter.

Figure 7:
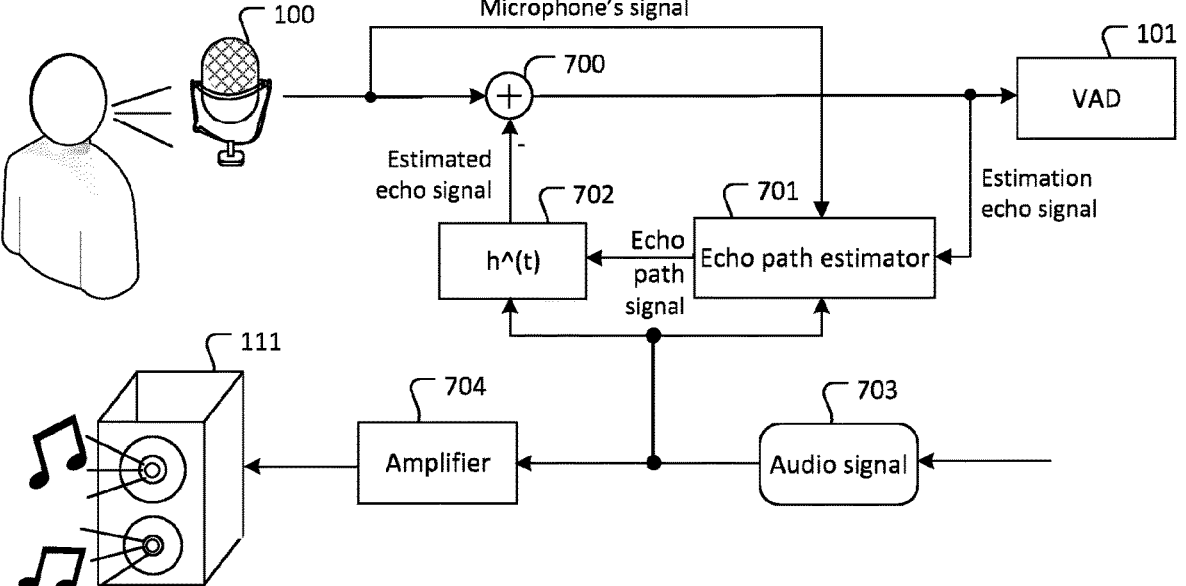
FIG. 7 schematically shows an acoustic echo cancellation process performed in the process of audio signal adjustment as described in FIG. 1.

FIG. 7 schematically shows an acoustic echo cancellation process performed in the process of audio signal adjustment as described in FIG. 1 above. A User's microphone 100 acquires the User's voice and, in order to prevent generation of a potential echo signal, the User's voice signal s(n) is transmitted to a mixer 700 and an Echo path estimator 701. The Echo path estimator 701 estimates the acoustic path to obtain an acoustic Echo path signal, which is transmitted to an adaptive finite impulse response (FIR) filter hˆ(t). The adaptive FIR filter hˆ(t) performs filtering on the echo path signal using an algorithm, which continuously adapts the FIR filter hˆ(t) to model the acoustic path, to obtain an Estimated echo signal. The Estimated echo signal is subtracted from the acoustic Echo path signal to produce a "clean" signal output with the linear portion of acoustic echoes largely removed. The adaptive FIR filter hˆ(t) is adjusted until an error, which is a difference between the Estimated echo signal and a desired signal, such as a signal without echo, is minimized. The error can be an Estimated error signal. Echo cancellation process involves recognizing the originally transmitted signal that re-appears, with some delay, in the transmitted or received signal. Once the echo is recognized, it can be removed by subtracting it from the transmitted signal, here the User's microphone signal $s_U(n)$, or the received signal, here the adjusted audio signal $s''_O(n)$. Subsequently, the User's voice signal $s_U(n)$ is transmitted to a Voice Activity Detector (VAD) 101.

Gain Adjustment

Figure 8:
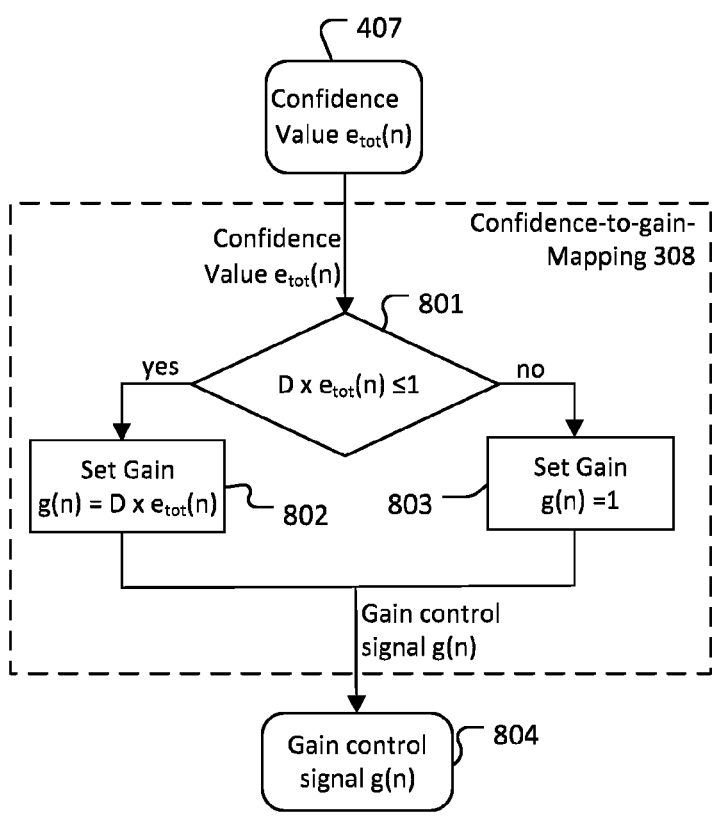
FIG. 8 shows a flow diagram visualizing shows a flow diagram visualizing a Confidence-to-gain Mapping process based on a confidence value performed in the process of Confidence Analyzer as de scribed in FIG. 3.

FIG. 8 shows a flow diagram visualizing a Confidence-to-gain Mapping process based on a confidence value performed in the process of Confidence Analyzer as described in FIG. 3. The Confidence-to-gain Mapping 308 receives a Confidence Value $e_{tot}(n)$, obtained by the Confidence Estimator 308 in FIG. 3. The Gain control signal g(n) (Gain) is obtained by $$g(n)=D \times e_{tot}(n)$$

wherein D is a predetermined constant. For example, D=2/ $(A \times 600 + B \times 5 \times \sqrt{E})$, where E is the energy of the impulse response of the LP 606.

If $D \times e_{tot}(n) \leq 1$, at 801, then the Confidence-to-gain Mapping 308 sets the Gain $g(n)=D \times e_{tot}(n)$, at 802. If $D \times e_{tot}(n) > 1$, at 801, the Confidence-to-gain Mapping 308 sets the Gain g(n)=1, at 803. At 804, the gain control signal g(n) is obtained.

The Gain 105 applies the contribution of the Original Vocals $s_O(n)$ to the mix, e.g. the adjusted audio signal $s''_O(n)$, ranging continuously from '0=no contribution' to '1=unchanged contribution', the former of course giving the "stage" to the user entirely, where the latter effects normal play back. That is, the confidence-to-gain mapping 308 may set the gain control signal 407 in such a way that the user receives no guidance if the user is singing in perfect pitch.

However, it is not a binary system, i.e. the Confidence Analyzer 102 may also just lower the original vocals, but not remove them entirely, depending on the instantaneous value of the confidence measure. The level of the Original Vocals $s_O(n)$ is entirely controlled by the Confidence Analyzer 102, and thus the Confidence Value $e_{tot}(n)$. Low confidence may lead to unaltered playback and high confidence may lead to full removal of the Original Vocals $s_O(n)$.

In the embodiment of FIG. 8, the Gain control signal g(n) is obtained by the linear function $g(n)=D \times e_{tot}(n)$, without limiting the present embodiment in that regard. Alternatively, the Gain control signal g(n) can be obtained by any non-linear function know to the skilled person and which can be selected according to a design choice of the skilled person.

Object-Based Audio Signal Adjustment Based on Confidence Analysis

Figure 9:
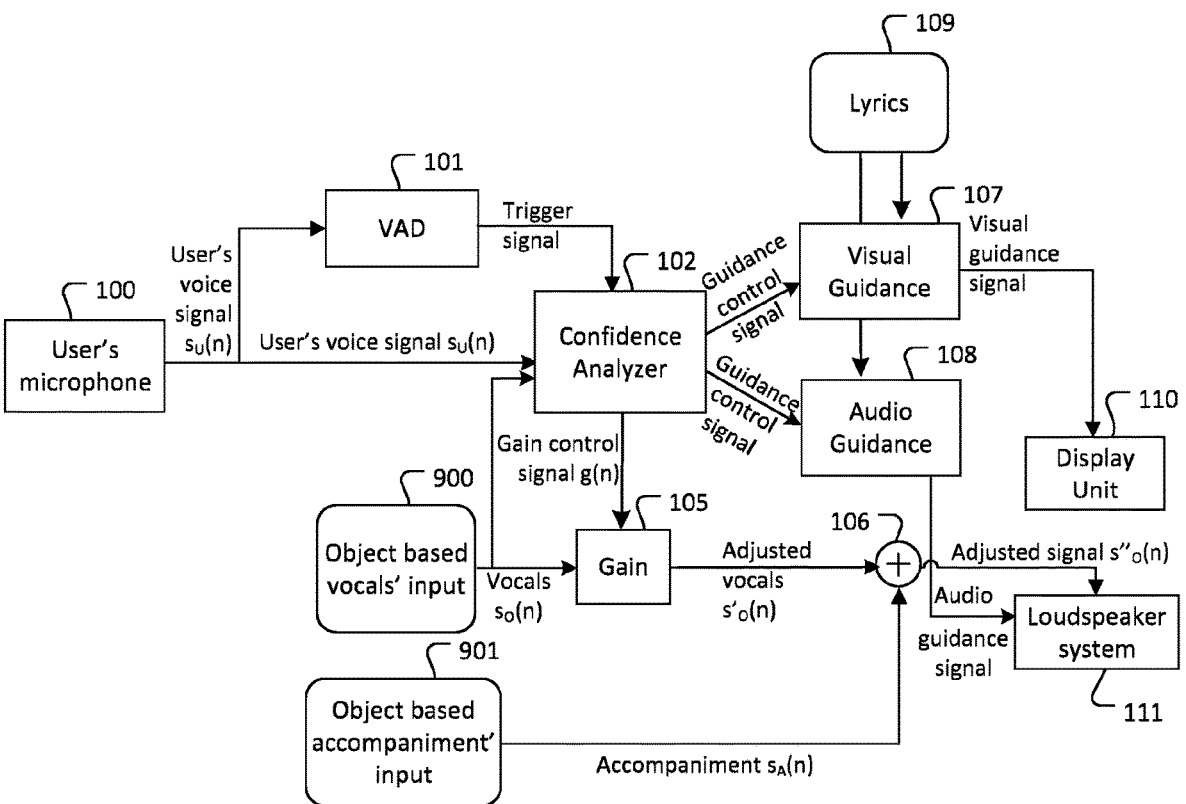
FIG. 9 schematically shows a process of audio adjustment of an object-based audio signal based on confidence analysis.

FIG. 9 schematically shows a process of audio adjustment of an object-based audio signal based on confidence analysis. The object-based audio signal is an audio input signal x(n) containing object-based vocals and object-based accompaniment. The object-based vocals are an Original Vocals signal $s_O(n)$ and the object-based accompaniment is an Accompaniment signal $s_A(n)$. The Original Vocals $s_O(n)$ are transmitted to a Confidence Analyzer 102 and a Gain 105. A User's microphone 100 acquires the User's voice and transmits a User's voice signal $s_O(n)$ to a Voice Activity Detector (VAD) 101 and the Confidence Analyzer 102. A process of the Voice Activity Detector 101 is per formed on the User's voice signal $s_V(n)$ to obtain a Trigger signal. The Trigger signal triggers a process of the Confidence Analyzer 102 based on the detected User's voice signal $s_U(n)$. A process of the Confidence Analysis 102 is performed on the User's voice signal $s_U(n)$ based on the Vocals $s_O(n)$, obtained from the audio input signal x(n), to obtain a Gain control signal g(n) and Guidance control signals. Based on the Gain control signal g(n), the Gain 105 is applied on the Vocals $s_O(n)$ to obtain Adjusted Vocals $s'_O(n)$. A mixer 106 mixes the Adjusted Vocals $s'_O(n)$, obtained by the Gain 105, to the Accompaniment $s_A(n)$, to obtain an adjusted audio signal $s''_O(n)$. The Confidence Analyzer 102 controls a Visual Guidance 107 and an Audio Guidance 108 based on the Guidance control signals 311 to obtain a Visual guidance signal and an Audio guidance signal respectively. The Visual Guidance 107 and the Audio Guidance 108 are performed based on Lyrics 109 of a piece of music, being acquired from readily available databases. Alternatively, If the song's metadata does not lead to a match, Lyrics 109 extraction is performed offline first. Based on the Visual guidance signal visual guidance is displayed on a Display Unit 110. Based on the Audio guidance signal acoustic guidance is output by a Loudspeaker system 111. The Visual Guidance 107 may be lyrics, pitch correction indication, rhythm orientation, or the like. The Audio Guidance 108 may be a 'Suffleur system', where the system utters the lyrics ahead of their temporal position in the piece (like in theatre). In this case the Lyrics 109 are synthesized in spoken voice and acoustically delivered ahead of time to the user.

Audio Signal Adjustment Using Acoustic Echo Cancellation

Figure 10:
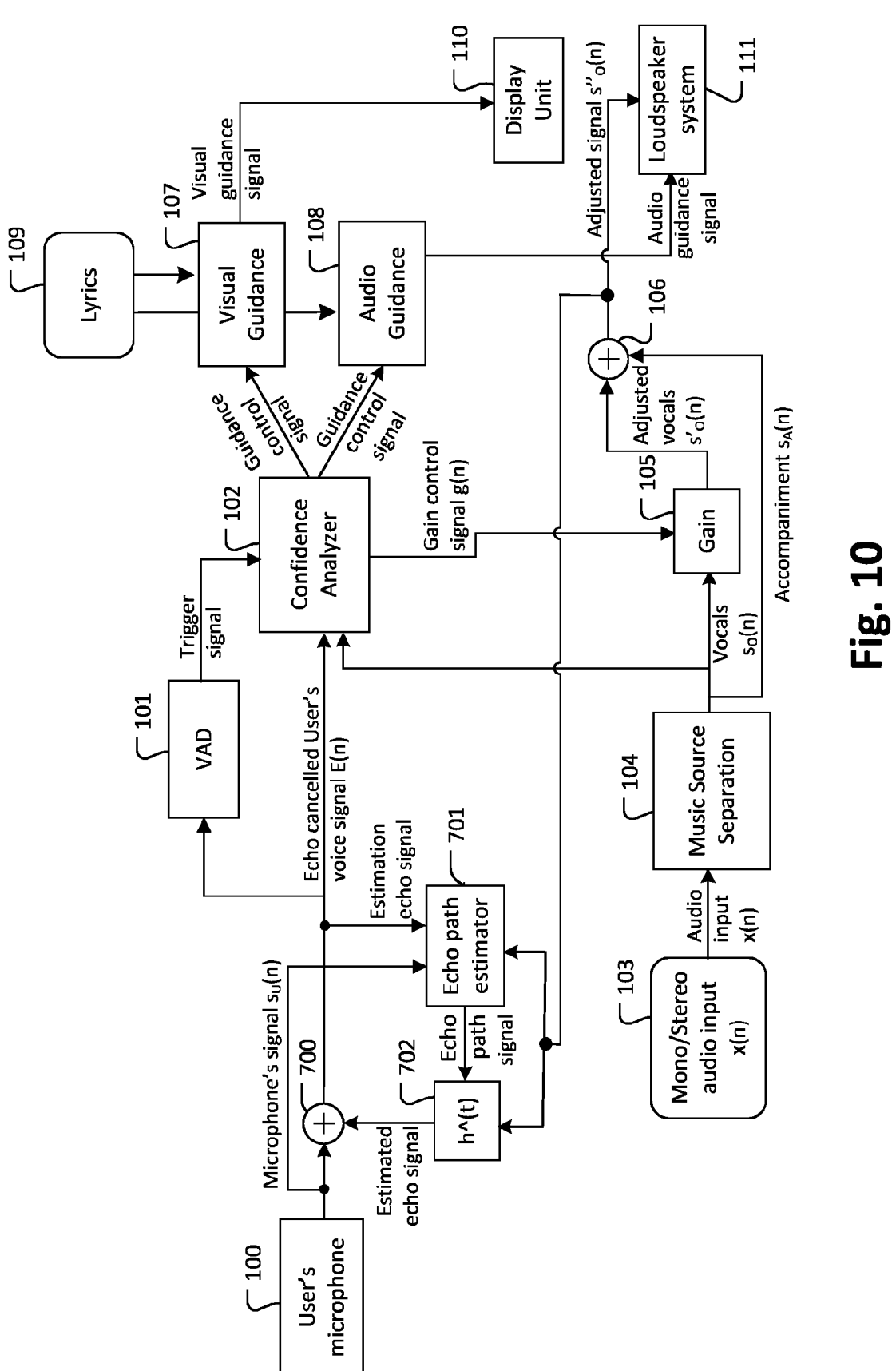
FIG. 10 schematically shows an embodiment of a process of audio adjustment of an audio signal as described in FIG. 1.

FIG. 10 schematically shows an embodiment a process of audio adjustment of an audio signal as described in FIG. 1 above, in which echo cancellation is performed as described in FIG. 7 above. An audio input signal x(n) containing multiple sources (see 1, 2, . . . , K in FIG. 1), such as a mono or stereo audio input 103 signal x(n), e.g. a piece of music, is input to a Music Source Separation 104 and de composed into separations (see separated source 2 and residual signal 3 in FIG. 2), here into a separated source 2, namely "Vocals" $s_O(n)$, and a residual signal 3, namely "Accompaniment" $s_A(n)$. The Vocals $s_O(n)$ are transmitted to a Confidence Analyzer 102 and a Gain 105. A User's micro phone 100 acquires the User's voice $s_U(n)$ and, in order to prevent generation of a potential echo signal, is transmitted to a mixer 700 and an Echo path estimator 701. The Echo path estimator 701 estimates the acoustic path to obtain an acoustic Echo path signal, which is transmitted to an adaptive finite impulse response (FIR) filter $\hat{h}(t)$.

The adaptive FIR filter $\hat{h}(t)$ performs filtering on the echo path signal using an algorithm, which continuously adapts the FIR filter $\hat{h}(t)$ to model the acoustic path, to obtain an Estimated echo signal. The Estimated echo signal is subtracted from the acoustic Echo path signal to produce a "clean" signal output with the linear portion of acoustic echoes largely removed. The adaptive FIR filter $\hat{h}(t)$ is adjusted until an error, which is a difference between the Estimated echo signal and the desired signal, is minimized. The error can be an Estimated error signal. Echo cancellation involves first recognizing the originally transmitted signal that re-appears, with some delay, in the transmitted or received signal Once the echo is recognized, it can be removed by subtracting it from the transmitted signal, here the User's microphone signal $s_U(n)$, or the received signal, here the adjusted audio signal $s''_O(n)$ to obtain an Echo cancelled User's voice signal E(n).

Subsequently, the User's voice signal $s_U(n)$ is transmitted to a Voice Activity Detector (VAD) 101 and the Confidence Analyzer 102. A process of the Voice Activity Detector 101 is performed on the User's voice signal $s_U(n)$ to obtain a Trigger signal. The Trigger signal triggers, based on the detected User's voice signal $s_U(n)$, the process of the Confidence Analyzer 102. A process of the Confidence Analysis 102 is performed on the User's voice signal $s_U(n)$ based on the Vocals $s_O(n)$, obtained from the audio input signal x(n), to obtain a Gain control signal g(n) and Guidance control signals. Based on the Gain control signal g(n), the Gain 105 is applied on the Vocals $s_O(n)$ to obtain Adjusted Vocals $s'_O(n)$. A mixer 106 mixes the Adjusted Vocals $s'_O(n)$, obtained by the Gain 105, to the Accompaniment $s_A(n)$, obtained by the Music Source Separation 104, to obtain an adjusted audio signal $s''_O(n)$. The Confidence Analyzer 102 controls a Visual Guidance 107 and an Audio Guidance 108 based on the Guidance control signals 311 to obtain a Visual guidance signal and an Audio guidance signal respectively. The Visual Guidance 107 and the Audio Guidance 108 are performed based on Lyrics 109 of a piece of music, here the mono or stereo audio input 103 signal x(n), being acquired from readily available databases. Alternatively, If the song's metadata does not lead to a match, Lyrics 109 extraction is performed offline first. Based on the Visual guidance signal visual guidance is displayed on a Display Unit 110. Based on the Audio guidance signal acoustic guidance is output by a Loudspeaker system 111. The Visual Guidance 107 may be lyrics, pitch correction indication, rhythm orientation, or the like. The Audio Guidance 108 may be a 'Suffleur system', where the system utters the lyrics ahead of their temporal position in the piece (like in theatre). In this case the Lyrics 109 are synthesized in spoken voice and acoustically delivered ahead of time to the user.

In the embodiment of FIG. 10, a process of audio adjustment of an audio signal as described in FIG. 1 above, in which echo cancellation is performed is described, without limiting the present disclosure in that regard. Alternatively, echo cancellation may also be performed in a process of audio adjustment of an object-based audio signal as described in FIG. 9 above.

Figure 11:
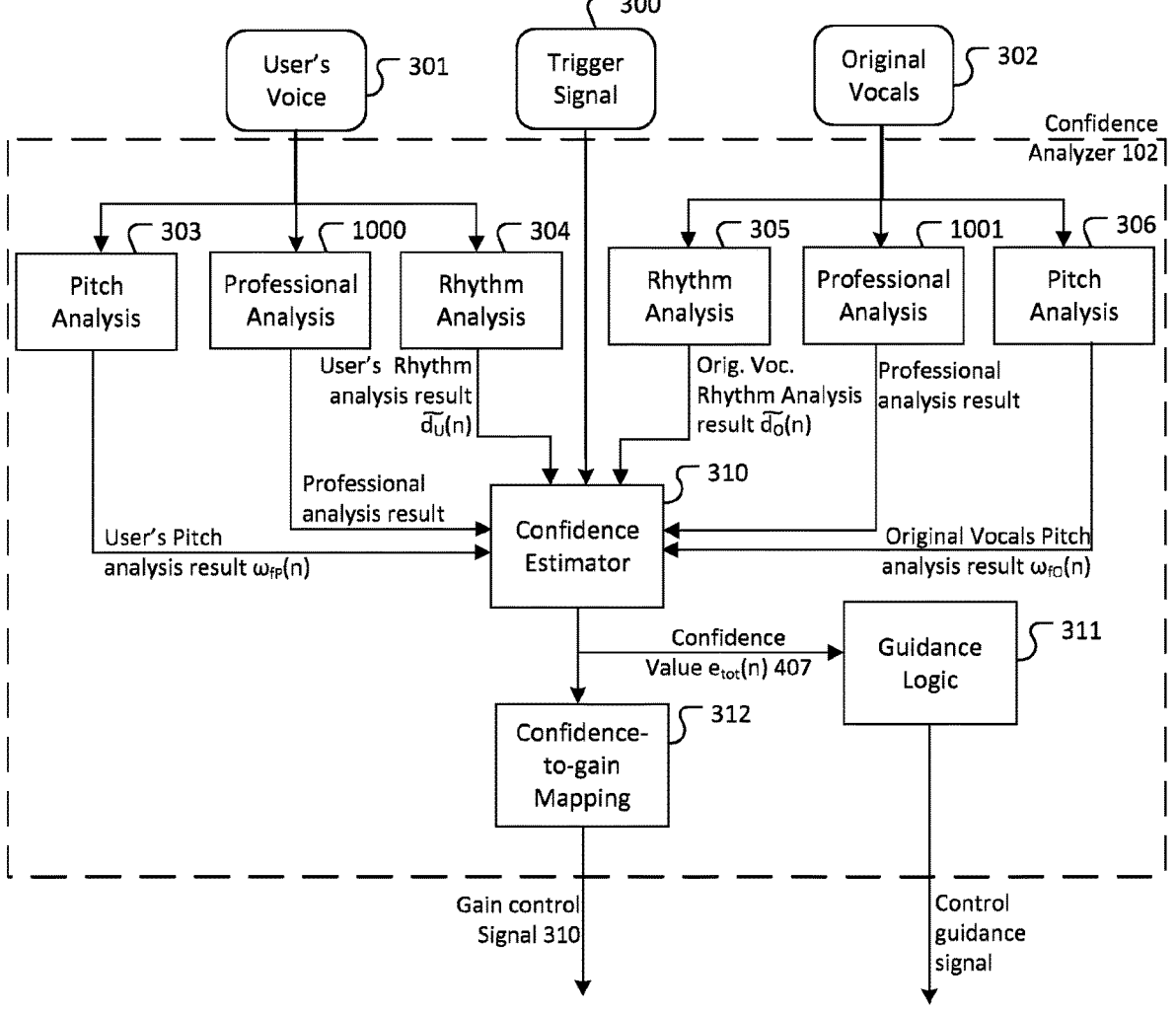
FIG. 11 schematically describes in more detail another embodiment of a process of the Confidence Analyzer performed in the process of audio signal adjustment as described in FIG. 1.

FIG. 11 schematically describes in more detail another embodiment of a process of the Confidence Analyzer performed in the process of audio signal adjustment as described in FIG. 1 above. The User's Voice 301 acquired by a User's microphone 100 and the Vocals 302 of an audio input signal x(n), obtained by Music Source Separation 104 (see FIG. 1) are analyzed by the Confidence Analyzer 102 based on a Trigger Signal 300 obtained by a Voice Activity Detector 101.

In particular, a Pitch Analysis 303 is performed on the User's Voice 301, to obtain a Pitch analysis result $\omega_f$, a Professional Analysis 1000 is performed on the User's Voice 301, to obtain a Professional analysis result and a Rhythm Analysis 304 is performed on the User's Voice 301, to obtain a Rhythm analysis result Simultaneously with the User's Voice 301, a Rhythm Analysis 305 is per formed on the Original Vocals 302, to obtain a Rhythm analysis result, a Professional Analysis 1001 is performed on the Original Vocals 302, to obtain a Professional analysis result and a Pitch Analysis 306 performed on the Original Vocals 302, to obtain a Pitch analysis result $\omega_f$. A process of a Confidence Estimator 307 is performed on the Pitch analysis result $\omega_f$, to obtain a Professional analysis result, e.g. vibrato (energy modulation spectrum), vocal range, etc., and the Rhythm analysis result d(n) of both User's Voice 301 and Vocals 302, to obtain a Confidence Value 407. A Confidence-to-gain Mapping (308) is performed based on the confidence value ($e_{tot}(n)$) to obtain a gain control signal (407). The Confidence-to-gain Mapping 308 maps the Confidence Value 407 with a gain value. That is, based on the result of the Confidence Estimator 307, e.g. the Confidence Value 407, the Confidence Analyzer determines the gain from the Confidence-to-gain Mapping 308 stage. Simultaneously with the Confidence-to-gain Mapping 308, a process of a Guidance Logic 309 is performed based on the Confidence Value, to obtain a Guidance Control signal (see 311 in FIG. 3). The Guidance Logic 309 based on its settings, controls guidance features, such as Visual Guidance 107 (see FIG. 1) and Audio Guidance 108 (see FIG. 1).

Method and Implementation

FIG. 12 shows a flow diagram visualizing a method for signal mixing based on a Confidence Analyzer process and based on separated sources. At 1100, the music source separation (see 104 FIG. 1) receives an audio input signal (see x(n) in FIG. 1). At 1101, music source separation (see 104 FIG. 1) is performed based on the received audio input signal to obtain vocals and accompaniments (see FIG. 1). At 1102, confidence analysis (see 102 in FIG. 1) is performed on the user's voice based on original vocals to obtain a confidence value (see FIGS. 1, 3, 4, 9 and 10). At 1103, a gain (see 105 in FIG. 1) of the vocals is adjusted based on the confidence value to obtain adjusted vocals (see FIG. 8). At 1104, mixing (see 106 in FIGS. 1, 9 and 10) of the adjusted vocals with the accompaniments to obtain an adjusted audio signal. At 105, the adjusted audio signal is output to a loudspeaker system (see 111 in FIGS. 1, 9 and 10). At 1106, visual guidance (see 107 in FIGS. 1, 9 and 10) and audio guidance (see 108 in FIGS. 1, 9 and 10) is performed based on the confidence value to obtain a visual guidance signal and an audio guidance signal respectively.

At 1107, the visual guidance is output to a display unit (see 110 in FIGS. 1, 9 and 10) and audio guidance is output to a loudspeaker system (see 111 in FIGS. 1, 9 and 10).

In the embodiment of FIG. 12, a flow diagram visualizing a method for signal mixing based on music source separation is described, however, the present disclosure is not limited to the method steps described above. For example, a separated object-based audio signal may be input as an audio input signal (see FIG. 9) instead of a mono/stereo audio input signal, or the like. In addition, the steps of visual and audio guidance may be performed simultaneously with the step of outputting the adjusted audio to the loudspeaker system, since the above described method is the method of a real-time process. That is, the system performing the above process is an interactive and adaptive system that processes the audio material in real time, for example from stream or any other local medium.

Figure 13:
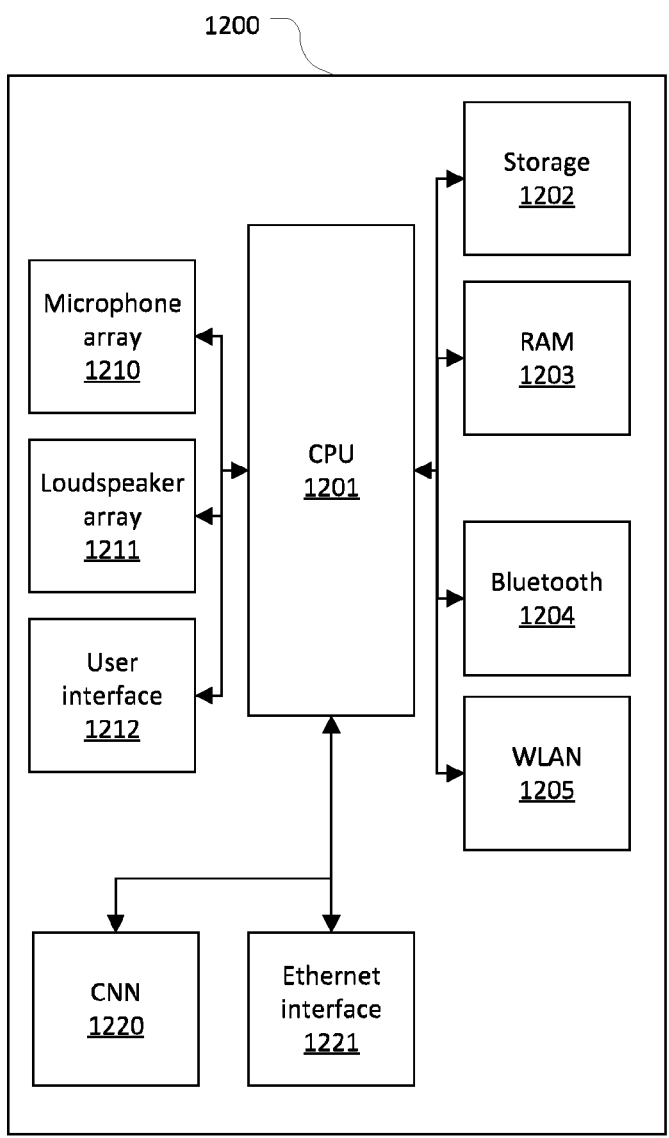
FIG. 13 schematically describes an embodiment of an electronic device that can implement the processes of audio mixing based on confidence analysis and music source separation.

FIG. 13 schematically describes an embodiment of an electronic device that can implement the processes of audio mixing based on confidence analysis and music source separation, as described above. The electronic device 1200 comprises a CPU 1201 as processor. The electronic device 1200 further comprises a microphone array 1210, a loudspeaker array 1211 and a convolutional neural network unit 1220 that are connected to the processor 1201. The processor 1201 may for example implement a Confidence Analyzer 102, a Gain 105, a Visual Guidance 107 and an Audio Guidance 108 that realize the processes described with regard to FIG. 1, FIG. 3, FIG. 4, FIG. 5, FIG. 6, FIG. 9 and FIG. 10 in more detail. The CNN 1220 may for example be an artificial neural network in hardware, e.g. a neural network on GPUs or any other hardware specialized for the purpose of implementing an artificial neural network. The CNN 1220 may for example implement a source separation 104, and/or an Echo Cancellation that realize the processes described with regard to FIG. 1, FIG. 7 and FIG. 10 in more detail. Loudspeaker array 1211, such as the Loudspeaker system 111 described with regard to FIG. 1, FIG. 7 and FIG. 10, consists of one or more loudspeakers that are distributed over a predefined space and is configured to render any kind of audio, such as 3D audio. The electronic de vice 1200 further comprises a user interface 1212 that is connected to the processor 1201. This user interface 1212 acts as a man-machine interface and enables a dialogue between an administrator and the electronic system. For example, an administrator may make configurations to the system using this user interface 1212. The electronic device 1200 further comprises an Ethernet interface 1221, a Bluetooth interface 1204, and a WLAN interface 1205. These units 1204, 1205 act as I/O interfaces for data communication with external devices. For example, additional loudspeakers, microphones, and video cameras with Ethernet, WLAN or Bluetooth connection may be coupled to the processor 1201 via these interfaces 1221, 1204, and 1205. The electronic device 1200 further comprises a data storage 1202 and a data memory 1203 (here a RAM). The data memory 1203 is arranged to temporarily store or cache data or computer instructions for processing by the processor 1201. The data storage 1202 is arranged as a long-term storage, e.g. for recording sensor data obtained from the microphone array 1210 and provided to or retrieved from the CNN 1220.

It should be noted that the description above is only an example configuration. Alternative configurations may be implemented with additional or other sensors, storage devices, interfaces, or the like.

It should be recognized that the embodiments describe methods with an exemplary ordering of method steps. The specific ordering of method steps is, however, given for illustrative purposes only and should not be construed as binding.

It should also be noted that the division of the electronic device of FIG. 13 into units is only made for illustration purposes and that the present disclosure is not limited to any specific division of functions in specific units. For instance, at least parts of the circuitry could be implemented by a respectively programmed processor, field programmable gate array (FPGA), dedicated circuits, and the like.

All units and entities described in this specification and claimed in the appended claims can, if not stated otherwise, be implemented as integrated circuit logic, for example, on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An electronic device comprising circuitry configured to perform audio source separation (104) on an audio input signal (x(n)) to obtain a vocals signal ($s_O$(n)) and an accompaniment signal ($s_A$(n)) and to perform a confidence analysis (102) on a user's voice signal ($s_U$(n)) based on the vocals signal ($s_O$(n)) to provide guidance to the user.

(2) The electronic device of (1), wherein the circuitry is further configured to obtain an adjusted vocals signal ($s'_O$ (n)) from the vocals signal ($s_O$(n)) and to perform mixing (106) of the adjusted vocals signal ($s'_O$(n)) with the accompaniment signal ($s_A$(n)), to obtain an adjusted audio signal ($s''_O$(n)) for providing guidance to the user.

(3) The electronic device of (2), wherein the circuitry is further configured to play back the adjusted audio signal ($s''_O$(n)) for providing guidance to the user.

(4) The electronic device of (2), wherein the circuitry is further configured to perform a gain control (105) on the vocals signal ($s_O$(n)) based on the confidence analysis (102) to obtain the adjusted vocals signal ($s'_O$(n)).

(5) The electronic device of anyone of (1) to (4), wherein the circuitry is further configured to generate a guidance control signal (311) based on the confidence analysis (102) and to perform a visual or audio guidance (107) based on the guidance control signal (311) for providing guidance to the user.

(6) The electronic device of anyone of (1) to (5), wherein the circuitry is further configured to perform pitch analysis (306) on the vocals signal ($s_O$(n)) to obtain a vocals pitch analysis result ($\omega_{fO}$(n)), to perform a pitch analysis (303) on the user's voice ($s_U$(n)) to obtain a user's pitch analysis result ($\omega_{fU}$(n)), and to perform a vocals pitch comparison (404) based on the vocals pitch analysis result ($\omega_{fO}$(n)) and the a user's pitch analysis result ($\omega_{fU}$(n) to obtain a pitch error ($e_P$(n)).

(7) The electronic device of anyone of (1) to (6), wherein the circuitry is further configured to perform rhythm analysis (305) on the vocals signal ($s_O$(n)) to obtain a vocals rhythm analysis result ($\tilde{d}_o$(n)), to perform a rhythm analysis (304) on the user's voice ($s_U$(n)) to obtain a user's rhythm analysis result ($\tilde{d}_U$(n)), and to perform a vocals rhythm comparison (405) based on the vocals rhythm analysis result ($\tilde{d}_O$(n)) and the user's rhythm analysis result ($\tilde{d}_U$(n)) to obtain a rhythm error ($e_R$(n)).

(8) The electronic device of (5), wherein the circuitry is further configured to perform a confidence estimation (307) based on the pitch analysis result ($\omega_{fO}$(n), $\omega_{fU}$(n)) and based on the rhythm analysis result ($\tilde{d}_O$(n), $\tilde{d}_U$(n)) to obtain a confidence value ($e_{tot}$(n)).

(9) The electronic device of (8), wherein the circuitry is further configured to perform a confidence-to-gain mapping (308) based on the confidence value ($e_{tot}$(n)) to obtain a gain control signal (407).

(10) The electronic device of (8), wherein the circuitry is further configured to perform a guidance logic (309) based on the confidence value ($e_{tot}$(n)) to obtain a guidance control signal (311).

(11) The electronic device of anyone of (1) to (10), wherein the circuitry is further configured to perform voice activity detection (101) on the user's voice signal ($s_U$(n)) to obtain a trigger signal (300) that triggers the confidence analysis (102).

(12) The electronic device of anyone of (8), wherein the confidence analyzer (102) is further con figured to provide guidance to the user based on the confidence value ($e_{tot}$(n)).

(13) The electronic device of anyone of (9), wherein the confidence-to-gain mapping (308) is con figured to set the gain control signal (407) in such a way that the user receives no guidance if the user is singing in perfect pitch.

(14) The electronic device of anyone of (1) to (13), wherein the audio input signal (x(n)) comprises a mono and/or stereo audio input signal (x(n)) or the audio input signal (x(n)) comprises an object-based audio input signal.

(15) The electronic device of anyone of (1) to (14), wherein the circuitry is further configured to perform echo cancellation on the user's voice ($s_U$(n)) to obtain an echo free user's voice.

(16) The electronic device of anyone of (1) to (15), wherein the circuitry is further configured to perform a professional analysis (1001) on the vocals signal ($s_O$(n)) to obtain a vocals professional analysis result, to perform a professional analysis (1000) on the user's voice ($s_U$(n)) to obtain a user's professional analysis result ($\tilde{d}_U$(n)).

(17) The electronic device of anyone of (1) to (16), wherein the circuitry comprises a microphone configured to capture the user's vocals signal ($s_U$(n)).

(18) A method comprising:
performing audio source separation (104) on an audio input signal (x(n)) to obtain a vocals signal ($s_O$(n)) and an accompaniment signal ($s_A$(n)); and
performing confidence analysis (102) on a user's voice ($s_U$(n)) based on the vocals signal ($s_O$(n)) to provide guidance to the user.

(19) A computer program comprising instructions, the instructions when executed on a processor causing the processor to perform the method of (18).

The invention claimed is:

1. An electronic device comprising:
circuitry configured to
   perform audio source separation on an audio input signal (x(n)) to obtain a vocals signal ($s_O$(n)) and an accompaniment signal ($s_A$(n)); and
   perform a confidence analysis on a user's voice signal ($s_U$(n)) based on the vocals signal ($s_O$(n)) to provide real-time guidance to the user by adjusting a level of the vocals signal in real-time based on the confidence analysis such that the level of the vocals signal is reduced as a confidence value resulting from the confidence analysis increases.

2. The electronic device of claim 1, wherein the circuitry is further configured to obtain an adjusted vocals signal (s'$_O$(n)) from the vocals signal (s$_O$(n)) and to perform mixing of the adjusted vocals signal (s'$_O$(n)) with the accompaniment signal (s$_A$(n)), to obtain an adjusted audio signal (s"$_O$(n)) for providing guidance to the user.

3. The electronic device of claim 2, wherein the circuitry is further configured to play back the adjusted audio signal (s"$_O$(n)) for providing guidance to the user.

4. The electronic device of claim 2, wherein the circuitry is further configured to perform a gain control on the vocals signal (s$_O$(n)) based on the confidence analysis to obtain the adjusted vocals signal (s'$_O$(n)).

5. The electronic device of claim 1, wherein the circuitry is further configured to generate a guidance control signal based on the confidence analysis and to perform a visual or audio guidance based on the guidance control signal for providing guidance to the user.

6. The electronic device of claim 1, wherein the circuitry is further configured to perform pitch analysis on the vocals signal (s$_O$(n)) to obtain a vocals pitch analysis result ($\omega_{fO}$(n)), to perform a pitch analysis (303) on the user's voice (s$_U$(n)) to obtain a user's pitch analysis result ($\omega_{fU}$(n)), and to perform a vocals pitch comparison based on the vocals pitch analysis result ($\omega_{fO}$(n)) and the user's pitch analysis result ($\omega_{fU}$(n) to obtain a pitch error (e$_P$(n)), wherein the pitch analysis includes calculating a frequency ration in cents and performing a modulo-600 operation to maintain the frequency ratio within half an octave.

7. The electronic device of claim 1, wherein the circuitry is further configured to perform rhythm analysis on the vocals signal (s$_O$(n)) to obtain a vocals rhythm analysis result ($\tilde{d}_O$(n)), to perform a rhythm analysis on the user's voice (s$_U$(n)) to obtain a user's rhythm analysis result ($\tilde{d}_U$(n)), and to perform a vocals rhythm comparison based on the vocals rhythm analysis result ($\tilde{d}_O$(n)) and the user's rhythm analysis result ($\tilde{d}_U$(n)) to obtain a rhythm error (e$_R$(n)).

8. The electronic device of claim 5, wherein the circuitry is further configured to perform a confidence estimation based on the pitch analysis result ($\omega_{fO}$(n), $\omega_{fU}$(n)) and based on the rhythm analysis result ($\tilde{d}_O$(n), $\tilde{d}_U$(n)) to obtain a confidence value (e$_{tot}$(n)).

9. The electronic device of claim 8, wherein the circuitry is further configured to perform a confidence-to-gain mapping based on the confidence value (e$_{tot}$(n)) to obtain a gain control signal.

10. The electronic device of claim 8, wherein the circuitry is further configured to perform a guidance logic based on the confidence value (e$_{tot}$(n)) to obtain a guidance control signal.

11. An electronic device comprising:
circuitry configured to
    perform audio source separation on an audio input signal (x(n)) to obtain a vocals signal (s$_O$(n)) and an accompaniment signal (s$_A$(n));
    perform a confidence analysis on a user's voice signal (s$_U$(n)) based on the vocals signal (s$_O$(n)) to provide guidance to the user; and
    perform voice activity detection on the user's voice signal (s$_U$(n)) to obtain a trigger signal that triggers the confidence analysis.

12. The electronic device of claim 8, wherein the circuitry is configured to provide guidance to the user based on the confidence value (e$_{tot}$(n)).

13. The electronic device of claim 9, wherein the confidence-to-gain mapping is configured to set the gain control signal in such a way that the user receives no guidance if the user is singing in perfect pitch.

14. The electronic device of claim 1, wherein the audio input signal (x(n)) comprises a mono and/or stereo audio input signal (x(n)) or the audio input signal (x(n)) comprises an object-based audio input signal.

15. The electronic device of claim 1, wherein the circuitry is further configured to perform echo cancellation on the user's voice (s$_U$(n)) to obtain an echo free user's voice.

16. The electronic device of claim 1, wherein the circuitry is further configured to perform a vocal characteristic analysis on the vocals signal (s$_O$(n)) to obtain a vocal characteristic analysis result, to perform a vocal characteristic analysis on the user's voice (s$_U$(n)) to obtain a user's vocal characteristic analysis result ($\tilde{d}_U$(n)).

17. The electronic device of claim 1, wherein the circuitry comprises a microphone configured to capture the user's vocals signal (s$_U$(n)).

18. A method comprising:
performing audio source separation on an audio input signal (x(n)) to obtain a vocals signal (s$_O$(n)) and an accompaniment signal (s$_A$(n)); and
performing confidence analysis on a user's voice (s$_U$(n)) based on the vocals signal (s$_O$(n)) to provide real-time guidance to the user by adjusting a level of the vocals signal in real-time based on the confidence analysis such that the level of the vocals signal is reduced as a confidence value resulting from the confidence analysis increases.

19. A non-transitory computer-readable medium including computer program comprising instructions, the instructions when executed by circuitry causing the circuitry to perform the method of claim 18.

20. The electronic device of claim 1, wherein the circuitry is configured to trigger the confidence analysis when the user starts singing above a predetermined threshold and stop the confidence analysis when the user stops singing or lowers voice below the predetermined threshold.

* * * * *